(12) United States Patent
Shiue et al.

(10) Patent No.: US 11,531,734 B2
(45) Date of Patent: Dec. 20, 2022

(54) DETERMINING OPTIMAL MACHINE LEARNING MODELS

(71) Applicant: Bank of America Corporation, Charlotte, NC (US)

(72) Inventors: WenTsong Shiue, Seattle, WA (US); Xianhong Zhang, Seattle, WA (US); Yu Fu, Seattle, WA (US)

(73) Assignee: Bank of America Corporation, Charlotte, NC (US)

( * ) Notice: Subject to any disclaimer, the term of this patent is extended or adjusted under 35 U.S.C. 154(b) by 254 days.

(21) Appl. No.: 16/916,306

(22) Filed: Jun. 30, 2020

(65) Prior Publication Data

US 2021/0406346 A1 Dec. 30, 2021

(51) Int. Cl.
*G06N 20/00* (2019.01)
*G06K 9/62* (2022.01)
*G06F 21/31* (2013.01)
*G06F 11/34* (2006.01)
*G06N 7/00* (2006.01)

(52) U.S. Cl.
CPC .......... *G06F 21/31* (2013.01); *G06F 11/3438* (2013.01); *G06K 9/623* (2013.01); *G06K 9/6262* (2013.01); *G06N 7/005* (2013.01); *G06N 20/00* (2019.01)

(58) Field of Classification Search
CPC ..... G06F 21/31; G06F 11/3438; G06N 20/00; G06N 7/005; G06K 9/623; G06K 9/6262
See application file for complete search history.

(56) References Cited

U.S. PATENT DOCUMENTS

| 8,843,427 B1* | 9/2014 | Lin ................. G06N 20/00 705/16 |
| 9,306,962 B1 | 4/2016 | Pinto |
| 9,858,529 B2 | 1/2018 | Adams et al. |
| 10,366,329 B2 | 7/2019 | Hinton et al. |
| 10,366,346 B2 | 7/2019 | Achin et al. |
| 2016/0364647 A1* | 12/2016 | Achin .................. G06N 5/04 |

(Continued)

OTHER PUBLICATIONS

Predicitive Model Markup Language Wikiepedia 5 pages.
(Continued)

*Primary Examiner* — Beau D Spratt
(74) *Attorney, Agent, or Firm* — Banner & Witcott, Ltd.

(57) ABSTRACT

Aspects of the disclosure relate to determining optimal machine learning models. A computing platform may collect, via a network, data indicative of login activity to an enterprise resource. One or more initial features indicative of the login activity may be identified. Based on the one or more initial features, an initial test dataset and a test model may be generated. Then, the test model may be deployed in a production environment. Subsequently, the computing platform may identify one or more production feature vectors. Then, the computing platform may generate, based on the one or more production feature vectors, a training dataset. Subsequently, the computing platform may perform, for the training dataset, a data quality check. Then, the computing platform may predict, by applying Bayesian optimization to the training dataset, an optimal machine learning model. Subsequently, the computing platform may apply the optimal machine learning model to detect unauthorized activity.

20 Claims, 21 Drawing Sheets

(56) References Cited

U.S. PATENT DOCUMENTS

| | | | | |
|---|---|---|---|---|
| 2018/0046796 A1* | 2/2018 | Wright | ............ | G06F 21/45 |
| 2018/0349158 A1 | 12/2018 | Swersky et al. | | |
| 2019/0034802 A1 | 1/2019 | Harshangi et al. | | |
| 2020/0004439 A1* | 1/2020 | Borlick | ............ | G06N 20/00 |
| 2020/0005168 A1* | 1/2020 | Bhargava | ............ | G06N 5/022 |
| 2020/0067948 A1 | 2/2020 | Baradaran et al. | | |
| 2020/0074540 A1* | 3/2020 | Wolfe | ............ | G06Q 40/025 |
| 2020/0184382 A1* | 6/2020 | Fishkov | ............ | G06N 5/003 |
| 2020/0328955 A1* | 10/2020 | Kurzynski | ............ | H04N 21/6582 |
| 2020/0349476 A1* | 11/2020 | Diamos | ............ | G06Q 10/04 |
| 2021/0012225 A1* | 1/2021 | Sathya | ............ | G06N 5/04 |
| 2021/0142329 A1* | 5/2021 | Aparício | ............ | G06N 20/00 |
| 2021/0182730 A1* | 6/2021 | Clarke | ............ | G06N 20/00 |
| 2021/0203515 A1* | 7/2021 | Deng | ............ | G06N 20/00 |
| 2021/0256502 A1* | 8/2021 | Taffer | ............ | G06Q 20/382 |
| 2021/0287273 A1* | 9/2021 | Janakiraman | ............ | G06N 20/10 |
| 2022/0073986 A1* | 3/2022 | Nalls | ............ | G16H 50/20 |

OTHER PUBLICATIONS

Vertica In-Database Machine Learning 2: Calculate a Correlation Matrix—A Data Exploration Post Sep. 5, 2019 Fard 18 pages.
Statistics by Jim How t-Test Work: t-Values, t-Distributions, and Probabilities Jim Frost 17 pages.
XGBoost Parameter Tuning | Guide to Parameter Tuning in SGBoost Analysitics Vidhya Jain 66 pages.
Various Ways to Evaluate a Machine Learning Model's Performance Nighania Dec. 30, 2018 8 pages.

* cited by examiner

```
params = (
    learning_rate : (0.001, 1.0),
    n_estimators : (100, 400),
    max_depth : (0, 12),
    subsample : (0.0, 1.0),
    colsample : (0.0, 1.0),
    reg_alpha : (0, 5),
    min_child_weight : (0.0, 0.12),
    colsample_bytree : (0.6, 1.0),       — 405
)
```

Change for big datasets # (1.0, 1.0)
Change for datasets with lots of features # (0.5, 1.0)

FIG. 4 threshold table: ← 605

| | threshold | challenge rate | fraud capture rate |
|---|---|---|---|
| 0 | 0.50 | 0.010198 | 0.985491 |
| 1 | 0.51 | 0.010198 | 0.984654 |
| 2 | 0.52 | 0.010198 | 0.984654 |
| 3 | 0.53 | 0.010198 | 0.984654 |
| 4 | 0.54 | 0.010198 | 0.984654 |
| 5 | 0.55 | 0.010198 | 0.984654 |
| 6 | 0.56 | 0.010198 | 0.984654 |
| 7 | 0.57 | 0.010198 | 0.984654 |
| 8 | 0.58 | 0.010198 | 0.984654 |
| 9 | 0.59 | 0.009647 | 0.984654 |
| 10 | 0.60 | 0.009647 | 0.984375 |
| 11 | 0.61 | 0.009372 | 0.984375 |
| 12 | 0.62 | 0.009372 | 0.983817 |
| 13 | 0.63 | 0.009096 | 0.983259 |
| 14 | 0.64 | 0.009096 | 0.982701 |
| 15 | 0.65 | 0.008820 | 0.982701 |
| 16 | 0.66 | 0.006615 | 0.979353 |
| 17 | 0.67 | 0.006615 | 0.978795 |
| 18 | 0.68 | 0.006064 | 0.978795 |
| 19 | 0.69 | 0.005788 | 0.978237 |
| 20 | 0.70 | 0.005788 | 0.977679 |
| 21 | 0.71 | 0.005237 | 0.977121 |
| 22 | 0.72 | 0.005237 | 0.977121 |
| 23 | 0.73 | 0.005237 | 0.975725 |
| 24 | 0.74 | 0.005237 | 0.975725 |
| 25 | 0.75 | 0.004686 | 0.974888 |
| 26 | 0.76 | 0.004410 | 0.974051 |
| 27 | 0.77 | 0.003859 | 0.974051 |
| 28 | 0.78 | 0.003859 | 0.972935 |
| 29 | 0.79 | 0.003583 | 0.972656 |
| 30 | 0.80 | 0.003583 | 0.972656 |
| 31 | 0.81 | 0.003308 | 0.972656 |
| 32 | 0.82 | 0.003308 | 0.971540 |
| 33 | 0.83 | 0.003308 | 0.969866 |
| 34 | 0.84 | 0.003032 | 0.969587 |
| 35 | 0.85 | 0.002481 | 0.968750 |
| 36 | 0.86 | 0.002205 | 0.967634 |
| 37 | 0.87 | 0.001929 | 0.964286 |
| 38 | 0.88 | 0.001929 | 0.964286 |
| 39 | 0.89 | 0.001654 | 0.964286 |
| 40 | 0.90 | 0.001654 | 0.963449 |
| 41 | 0.91 | 0.001378 | 0.962891 |
| 42 | 0.92 | 0.001378 | 0.961496 |
| 43 | 0.93 | 0.001103 | 0.959542 |
| 44 | 0.94 | 0.000827 | 0.950893 |
| 45 | 0.95 | 0.000827 | 0.946708 |

FIG. 6

| Rank | Feature Name | Pearson | Chi-2 | RFE | Logistics | Random Forest | Light GBM | XG Boost | extra Tree | decision Tree | Gradient Boost | ada Boost | Cal Boost | Total (True) |
|---|---|---|---|---|---|---|---|---|---|---|---|---|---|---|
| 1 | CBP_DEVC_CUST | True | True | True | True | True | True | True | True | True | True | True | True | 12 |
| 2 | CBP_CUST_DEVC | True | True | True | True | True | True | True | True | True | True | True | True | 12 |
| ... | | | | | | | | | | | | | | |
| 39 | CBP_CUST_ABDN_CHAL_NEWDEVC | True | True | True | False | True | True | True | False | True | False | True | False | 2 |

FIG. 10

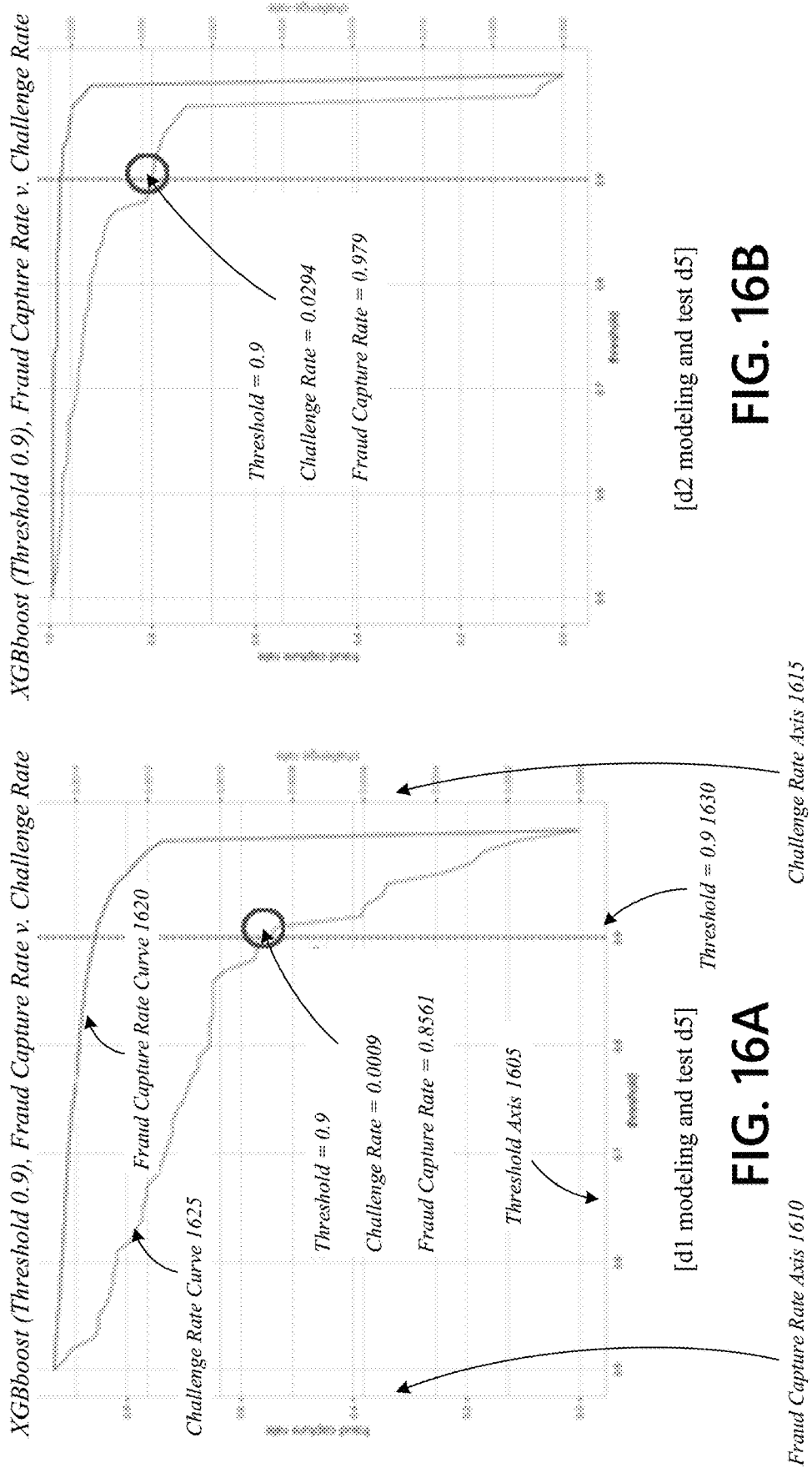

[d4 modeling and test d5]

[d3 modeling and test d5]

DETERMINING OPTIMAL MACHINE LEARNING MODELS

BACKGROUND

Aspects of the disclosure relate to deploying digital data processing systems to detecting unauthorized activities in enterprise systems. In particular, one or more aspects of the disclosure relate to determining optimal machine learning models to detect unauthorized activity.

In the performance of its various functions, an enterprise organization may need to process, store, transmit, and/or modify confidential information. In some instances, such information may be vulnerable to an unauthorized activity that may compromise security of the confidential information. Detecting unauthorized activity in real-time security may be highly advantageous to providing reliable enterprise functions. In many instances, however, it may be difficult to detect unauthorized activities in enterprise systems with speed and accuracy, while also attempting to optimize network resources, bandwidth utilization, and efficient operations of the associated computing infrastructure. Machine learning processing generally becomes more complex as the data is gradually increased. Data processing procedures become a challenge for machine learning. Generally, there is a lack of a methodology that focuses on model generation, exploration, and prediction/test verification, and incorporates data processing procedures, such as data quality check, feature engineering, and data analysis.

SUMMARY

Aspects of the disclosure provide effective, efficient, scalable, fast, reliable, and convenient technical solutions that address and overcome the technical problems associated with determining optimal machine learning models to detect unauthorized activity.

In accordance with one or more embodiments, a computing platform having at least one processor, and memory may collect, via a network, data indicative of login activity to an enterprise resource. Then, the computing platform may identify one or more initial features indicative of login activity to an enterprise resource. Subsequently, the computing platform may generate, based on the one or more initial features, an initial test dataset. Then, the computing platform may generate, based on the initial test dataset, a test model. Then, the computing platform may deploy the test model in a production environment. Subsequently, the computing platform may identify, based on the deploying, one or more production feature vectors. Then, the computing platform may generate, based on the one or more production feature vectors, a training dataset. Subsequently, the computing platform perform, for the training dataset, a data quality check. Then, the computing platform may predict, by applying Bayesian optimization to the training dataset, an optimal machine learning model. Subsequently, the computing platform may apply the optimal machine learning model to detect unauthorized attempts to access the enterprise resource.

In some embodiments, the computing platform may reduce, based on data analysis, the one or more initial features.

In some embodiments, the computing platform may perform the data quality check based on one or more performance criteria. In some embodiments, the one or more performance criteria may include one or more of a false positive rate (fpr), a true positive rate (tpr), an area under a curve (AUC), an F1-measure, and an accuracy (ACC).

In some embodiments, the computing platform may determine, for the training dataset, whether a false positive rate is below a first threshold. Then, the computing platform may determine, for the training dataset, whether a true positive rate is above a second threshold. Then, the computing platform may determine that one or more of: the false positive rate is above the first threshold, and the true positive rate is below the second threshold. Subsequently, the computing platform may adjust the initial test dataset.

In some embodiments, the computing platform may identify, based on the Bayesian optimization, one or more optimal hyper parameters for the optimal machine learning model.

In some embodiments, the computing platform may identify one or more candidate datasets. Then, the computing platform may reduce a number of combinations of the one or more candidate datasets, where generating the training dataset is based on the reduced number of combinations.

In some embodiments, the computing platform may, based on a determination that the quality of the initial test dataset does not meet a threshold, trigger an alert to modify the initial test dataset.

In some embodiments, the computing platform may generate a feature engineering table, wherein a row of the table represents a feature of the one or more initial features, and a column represents a candidate training model, and an entry in a cell corresponding to the row and the column is indicative of a significance of the feature to the candidate training model, and where predicting the optimal machine learning model is based on the feature engineering table.

In some embodiments, the computing platform may detect, via an iterative process, that the initial test dataset has been modified based on a determination that a quality of the initial test dataset does not meet a threshold. Then, the computing platform may update, via the iterative process, the feature engineering table.

In some embodiments, the computing platform may minimize a predictive error for the training model.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 4 depicts an illustrative configuration for Bayesian Optimization;

FIG. 6 depicts an example threshold table with false positive rates;

FIG. 10 depicts an example feature engineering table;

FIGS. 16A-D illustrate an example method of determining an optimal model;

DETAILED DESCRIPTION

Figure 1A:
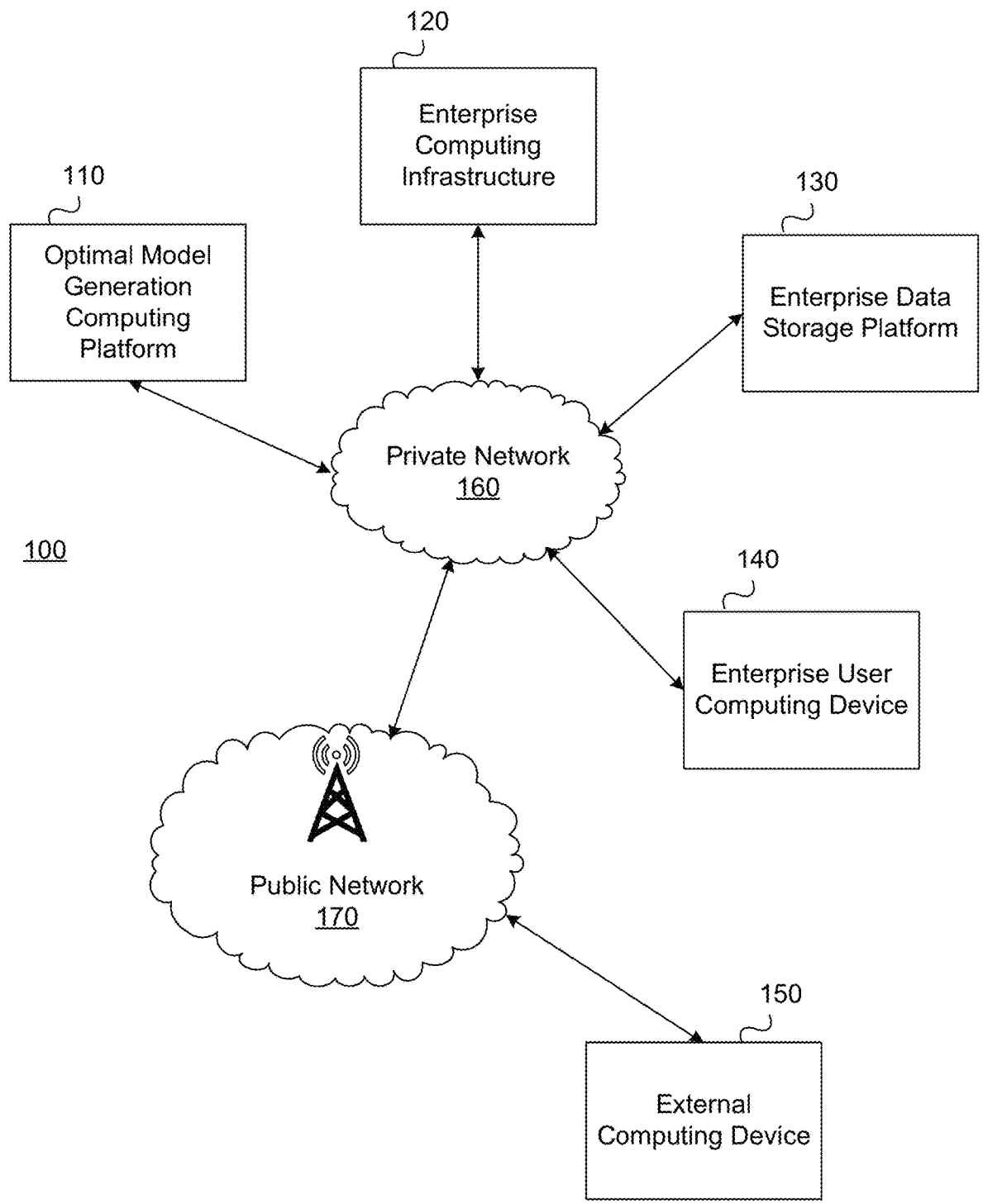
FIGS. 1A and 1B depict an illustrative computing environment for determining optimal machine learning models.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Enterprise organizations may deploy a variety of resources to protect an enterprise infrastructure from unauthorized access. In some aspects, an enterprise organization may monitor real-time login activity to detect potentially unauthorized activity. For example, one or more machine learning models may be utilized to detect potentially unauthorized activity in real-time. However, data discrepancies between a training dataset and a prediction and/or test dataset may pose a significant challenge to an effectiveness of such machine learning models. Also, for example, determining an optimal machine learning model may be time consuming, and may be detrimental to real-time detection of unauthorized activity.

Several aspects of the disclosure herein address such issues. For example, as described herein, (i) a dummy dataset/model may be generated, (ii) data quality check procedures may be performed, (iii) feature engineering techniques may be applied, and (iv) a Bayesian optimization algorithm may be utilized as a data massage procedure for model training. In some aspects, this may be an iterative procedure to keep monitoring data to ensure generation of an optimal model. At the beginning, initial features may be defined and an initial dummy dataset may be generated. The dummy dataset may be utilized to generate a dummy model, while determining that the defined features are used in the model. The dummy model may be deployed to production in passive mode, and production feature vectors may be sampled and/or collected as a training/prediction dataset. Generally, this may reduce data discrepancy between the training dataset and the prediction/test dataset.

Furthermore, upon generating the first real dataset, data analysis and feature engineering may be performed to reduce some of the features to obtain a better model. However, many feature values may have been filled in for removed features, and new features may be generated. Accordingly, previously unused features may be re-evaluated based on a data quality check to determine datasets that may be utilized for the machine learning model. Such a step may enable monitoring of the data quality, data correlation, and consistency at the stage of model training and prediction/testing. When performance metrics satisfy a threshold, feature engineering may not be performed. However, when performance metrics fail to satisfy the threshold, feature engineering may be performed to fine-tune the dataset and remove features that may be less relevant for model training.

In addition, the Bayesian Optimization search may be utilized for accelerating modeling processing in machine learning, and may facilitate the machine learning classifier to obtain optimal hyper-parameters for the model. In some instances, lower and higher bounds for 9 hyper-parameters of XGBoost, such as 'n_estimators', 'max_depth', 'learning_rate', and etc., may be configured, and cross-validated with a scoring of 'roc_auc'. While a Bayesian optimization search may take around 20-30 minutes to generate a model, a Grid Search method may take around 4-5 hours, thereby resulting in a significant reduction in time to generate the model.

Generally, an importance of data discrepancy between training data and a prediction/test dataset is overlooked, and an effect of the data discrepancy on the time to generate the model, including processing, taking into account complexities associated with many datasets involved, and so forth, may not be properly accounted for. In general, there may be a lack of fast and reliable methods to process data, generate the model, and perform the prediction/test simultaneously. Although data analysis and visualization may be utilized to determine data values distributed in features and feature correlations in a dataset, this may be time-consuming, and may generally not provide a means to determine the optimal model. Accordingly, data massage procedures for model generation, model prediction and testing are disclosed, along with model validation in a machine learning framework and flow.

A data massage methodology is described herein, may include (i) a data quality check that helps reduce a number of combinations of test datasets to efficiently and quickly determine optimal datasets as the trainset and perform a comprehensive iterative machine learning processing through several data generations for various numbers of features datasets, modeling and testing, (ii) feature engineering that helps to determine a possible different number of features datasets as trainsets, and perform a comprehensive iterative machine learning processing through the data generations for various number of features datasets, modeling and testing, (iii) an over-fitting test that determines that candidate models are not over-fitting while a complexity is increased. In some embodiments, steps (i) and (ii) may be performed iteratively. The number of iterations may depend on the datasets and feature vectors. A convergence time to determine the optimal model is dependent on a quality of the datasets.

Generally, the 'data quality check' at step (i) may be similar to a macro-view for the data, and may be termed as a massage push, and the 'feature engineering' at step (ii) may be similar to a micro-view for the data, and may be termed as a massage release. In addition, to the aforementioned data processing techniques, such data processing may be combined with an optimal XGBoost Classifier with a fast Bayesian Optimization search to quickly generate the optimal model, along with prediction and testing. As described herein, a discrepancy between the training data and prediction/test data may be minimized, and global optimization solution may be determined in an efficient and reliable manner.

Figure 1B:
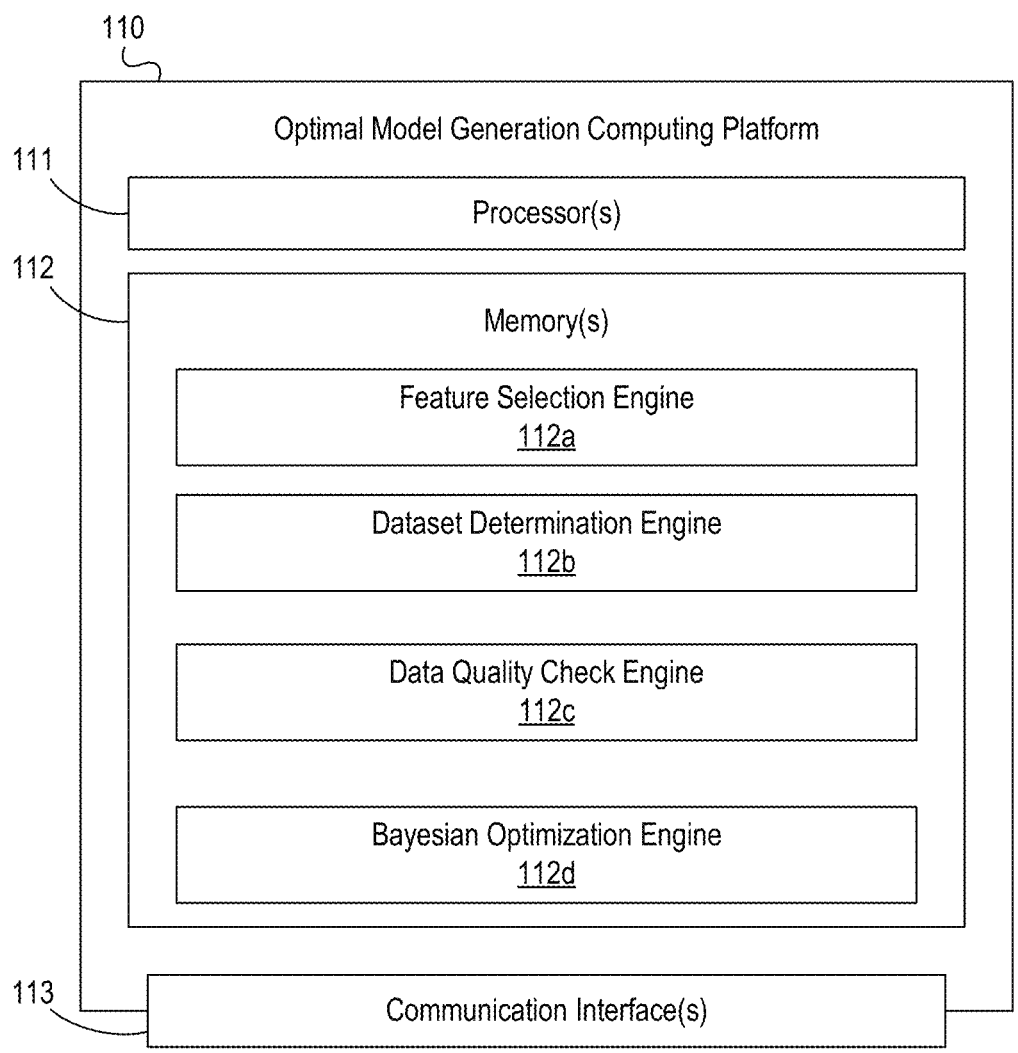

FIGS. 1A and 1B depict an illustrative computing environment for an automated and adaptive validation of a user interface. Referring to FIG. 1A, computing environment 100 may include one or more computer systems. For example, computing environment 100 may include an optimal model generation computing platform 110, enterprise computing infrastructure 120, an enterprise data storage platform 130, enterprise user computing device 140, and external computing device 150.

As illustrated in greater detail below, optimal model generation computing platform 110 may include one or more computing devices configured to perform one or more of the functions described herein. For example, optimal model generation computing platform 110 may include one or more computers (e.g., laptop computers, desktop computers, servers, server blades, or the like) and/or other computer components (e.g., processors, memories, communication interfaces).

Enterprise computing infrastructure 120 may include one or more computing devices and/or other computer components (e.g., processors, memories, communication interfaces). In addition, enterprise computing infrastructure 120 may be configured to host, execute, and/or otherwise provide one or more applications. For example, enterprise computing infrastructure 120 may be configured to host, execute, and/or otherwise provide one or more applications, such as, for example, feature extraction applications, feature vector determination applications, one or more statistical learning models, visualization applications, and/or other applications associated with an enterprise organization. In some instances, enterprise computing infrastructure 120 may be configured to provide various enterprise and/or back-office computing functions for an enterprise organization. For example, enterprise computing infrastructure 120 may include various servers and/or databases that store and/or otherwise maintain business information, information associated with business processes, and so forth. In addition, enterprise computing infrastructure 120 may process and/or otherwise execute actions based on information received from other computer systems included in computing environment 100. Additionally or alternatively, enterprise computing infrastructure 120 may receive instructions from optimal model generation computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data. For example, enterprise data storage platform 130 may be configured to store and/or otherwise maintain, test datasets, training datasets, log data related to various computing functions, such as, for example, user login activity data, and so forth. Additionally or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100.

Enterprise user computing device 140 may be a personal computing device (e.g., desktop computer, laptop computer) or mobile computing device (e.g., smartphone, tablet, wearable device). In addition, enterprise user computing device 140 may be linked to and/or used by a specific user (who may, e.g., be a customer of an organization operating optimal model generation computing platform 110). Also, for example, user of enterprise user computing device 140 may utilize enterprise user computing device 140 to review results of performance metrics, visualize data, manage generation and/or training of learning models.

External computing device 150 may be a personal computing device (e.g., desktop computer, laptop computer) or mobile computing device (e.g., smartphone, tablet, wearable device), that may be a source of information. Also, for example, user of external computing device 150 may utilize external computing device 150 to access resources of enterprise computing infrastructure 120.

Computing environment 100 also may include one or more networks, which may interconnect one or more of optimal model generation computing platform 110, enterprise computing infrastructure 120, enterprise data storage platform 130, enterprise user computing device 140, and/or external computing device 150. For example, computing environment 100 may include a private network 160 (which may, e.g., interconnect optimal model generation computing platform 110, enterprise computing infrastructure 120, enterprise data storage platform 130, enterprise user computing device 140, and/or one or more other systems which may be associated with an organization, and public network 170 (which may, e.g., interconnect enterprise user computing device 140 with private network 160 and/or one or more other systems, public networks, sub-networks, and/or the like). Public network 170 may be a cellular network, including a high generation cellular network, such as, for example, a 5G or higher cellular network. In some embodiments, private network 160 may likewise be a high generation cellular enterprise network, such as, for example, a 5G or higher cellular network. In some embodiments, computing environment 100 also may include a local network (which may, e.g., interconnect enterprise user computing device 140 and one or more other devices with each other).

In one or more arrangements, enterprise computing infrastructure 120, enterprise data storage platform 130, enterprise user computing device 140, and/or external computing device 150, and/or the other systems included in computing environment 100 may be any type of computing device capable of receiving input via a user interface, and communicating the received input to one or more other computing devices. For example, enterprise computing infrastructure 120, enterprise data storage platform 130, enterprise user computing device 140, and/or external computing device 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of optimal model generation computing platform 110, enterprise computing infrastructure 120, enterprise data storage platform 130, enterprise user computing device 140, and/or external computing device 150, may, in some instances, be special-purpose computing devices configured to perform specific functions.

Referring to FIG. 1B, optimal model generation computing platform 110 may include one or more processors 111, memory 112, and communication interface 113. A data bus may interconnect processor 111, memory 112, and communication interface 113. Communication interface 113 may be a network interface configured to support communication between optimal model generation computing platform 110 and one or more networks (e.g., network 160, network 170, a local network, or the like). Memory 112 may include one or more program modules having instructions that when executed by processor 111 cause optimal model generation computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of optimal model generation computing platform 110 and/or by different computing devices that may form and/or otherwise make up optimal model generation computing platform 110.

For example, memory 112 may have, store, and/or include a feature selection engine 112a, a dataset determination engine 112b, a data quality check engine 112c, and a Bayesian optimization engine 112d. Feature selection engine 112a may have instructions that direct and/or cause optimal model generation computing platform 110 to collect, via a network, data indicative of login activity to an enterprise resource. In some embodiments, feature selection engine 112a may have instructions that direct and/or cause optimal model generation computing platform 110 to identify one or more initial features indicative of the login activity. In some embodiments, feature selection engine 112a may have instructions that direct and/or cause optimal model generation computing platform 110 to identify, based on the deploying, one or more production feature vectors.

Dataset determination engine 112b may have instructions that direct and/or cause optimal model generation computing platform 110 to generate, based on the one or more initial features, an initial test dataset. In some embodiments, dataset determination engine 112b may have instructions that direct and/or cause optimal model generation computing platform 110 to generate, based on the one or more production feature vectors, a training dataset.

Data quality check engine 112c may have instructions that direct and/or cause optimal model generation computing platform 110 to generate, based on the initial test dataset, a test model. In some embodiments, data quality check engine 112c may have instructions that direct and/or cause optimal model generation computing platform 110 to deploy the test model in a production environment. In some embodiments, data quality check engine 112c may have instructions that direct and/or cause optimal model generation computing platform 110 to perform, for the training dataset, a data quality check.

Bayesian optimization engine 112d may have instructions that direct and/or cause optimal model generation computing platform 110 to determine, by applying Bayesian optimization to the training dataset, an optimal machine learning model. In some embodiments, Bayesian optimization engine 112d may have instructions that direct and/or cause optimal model generation computing platform 110 to identify, based on the Bayesian optimization, one or more optimal hyper parameters for the optimal machine learning model.

Generally, as users login via various portals to access enterprise resources (e.g., hosted by enterprise computing infrastructure 120), optimal model generation computing platform 110 may collect, via a network, data indicative of login activity to the enterprise resource. For example, a user of external computing device 150 may utilize external computing device 150 to access resources of enterprise computing infrastructure 120. Also, for example, a user of enterprise user computing device 140 may utilize enterprise user computing device 140 to access resources of enterprise computing infrastructure 120. One or more of such login activity may be a suspicious login activity. Several features of login activity may be collected and retrieved over the network, as illustrated in Table 1.

TABLE 1

| Feature Name | Feature Definition |
| --- | --- |
| DEVC_BROWLOCALE_FEAT_VALUE | Computes the last used browser language set by the device |
| CBP_CUST_DEVC | is a login from a new device |
| CBP_CUST_LOC | is a login from a new location |
| CBP_CUST_INTERLOC | is a login from an international location |
| CBP_CUST_IP | is a login from a new IP |
| CBP_CUST_SUBNETC | is a login from a new SUBNET_C |
| CBP_CUST_ISP | is a login from a new ISP |
| CBP_CUST_LGNFAILED_NEWDEVC | has failed logins from new devices in the last X days |
| CBP_CUST_ABDN_CHALL | has abandoned challenges in the last X days |
| CBP_CUST_ABDN_CHALL_NEWDEVC | has abandoned challenges from new device in the last X days |
| CBP_CUST_HIGH_LGN_DEVC | has a high number of login attempts from unique devices in the last X days |
| CBP_CUST_HIGH_LGN_IP | has a high number of login attempts from unique IPs in the last X days |
| CBP_CUST_CQ_LOCKED | has there been a Challenge Lockout in the last X days |
| CBP_CUST_OTP_LOCKED | has there been an OTP Lockout in the last X days |
| CBP_CUST_PASSWORD_CHANGE | is there a Password Change in the last X days |
| CBP_CUST_DEVC_VEL_1 CBP_CUST_DEVC_VEL_12 CBP_CUST_DEVC_VEL_24 CBP_CUST_DEVC_VEL_48 CBP_CUST_DEVC_VEL_72 CBP_CUST_DEVC_VEL_168 | Velocity of CBP_CUST_DEVC (6 features) |
| CBP_CUST_IP_VEL_12 CBP_CUST_IP_VEL_24 CBP_CUST_IP_VEL_48 CBP_CUST_IP_VEL_168 | Velocity of CBP_CUST_IP (4 features) |
| CBP_CUST_SUBNETC_VEL_12 CBP_CUST_SUBNETC_VEL_24 CBP_CUST_SUBNETC_VEL_48 CBP_CUST_SUBNETC_VEL_168 | Velocity of CBP_CUST_SUBNETC (4 features) |
| CBP_IVR_CALL_PLACED_VEL_24 CBP_IVR_CALL_PLACED_VEL_168 CBP_IVR_CALL_PLACED_VEL_336 CBP_IVR_CALL_PLACED_VEL_720 | Velocity of CBP_IVR_CALL_PLACED (4 features) |
| CBP_AACA_CALL_PLACED_VEL_168 CBP_AACA_CALL_PLACED_VEL_24 CBP_AACA_CALL_PLACED_VEL_336 CBP_AACA_CALL_PLACED_VEL_720 | Velocity of CBP_AACA_CALL_PLACED (4 features) |
| CBP_DEVC_BIND | is a login from a binded device |
| CBP_DEVC_CUST | is a login from a shared device |
| CBP_DEVC_ABDN_CHALL | has abandoned challenges from the device in the last X days |
| CBP_CUST_CHANNEL | channel of login |
| CBP_DEVC_CUST_VEL_05 (for 0.5 hr or 30 min window) CBP_DEVC_CUST_VEL_1 CBP_DEVC_CUST_VEL_12 CBP_DEVC_CUST_VEL_48 CBP_DEVC_CUST_VEL_168 | Velocity of CBP_DEVC_CUST (5 features) |
| CBP_IP_SUSPICIOUS | is a login from a suspicious IP |

Generally, in determining a machine learning model, determining a problem to be solved, and features related to that problem, are of high significance. These may also relate to types of algorithms that may be selected for the problem, such as (i) supervised learning (i.e. classification algorithms, or regression algorithms), (ii) unsupervised learning (i.e. clustering algorithms, anomaly detection algorithms, association rules, etc), and/or (iii) reinforcement learning (i.e. dynamic network quantization (DNQ) policy-based or value-based algorithms). As the problem of detecting unauthorized login activities may be related to a classification problem, an XGBoost algorithm may be utilized. However, for the grid search portion of the XGBoost algorithm, a Bayesian Optimization search may be utilized instead of grid search and random search.

Figure 2:
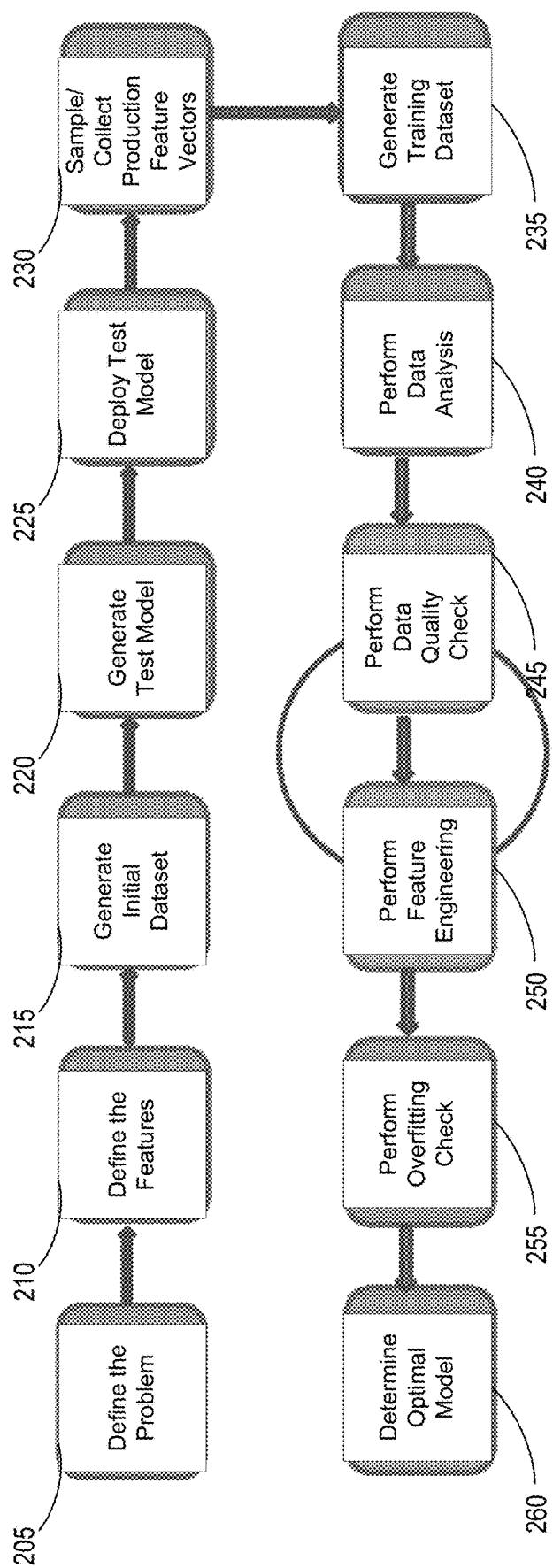
FIG. 2 depicts an illustrative design flow for determining optimal machine learning models.

FIG. 2 depicts an illustrative design flow for determining optimal machine learning models. Referring to FIG. 2, at step 205, a problem may be defined. At step 210, features may be defined (e.g., as illustrated in Table 1). At step 215, an initial dataset may be generated. At step 220, a test model may be generated. At step 225, the test model may be deployed to production in passive mode. At step 230, defined features may be utilized to sample and/or collect production feature vectors, ensuring that all defined features are utilized in the model. At step 235, a training dataset may be generated. At step 240, an offline data analysis may be performed. At step 245, a data quality check may be performed. At step 250, feature engineering and/or feature selection may be performed, and hyper-parameters of model may be determined. Generally, steps 245 and 250 may be performed iteratively in a loop to determine an optimal feature selection and training dataset, and also to minimize a difference between an initial dataset and a training dataset. At step 255, trainset and testset may be evaluated for over-fitting. At step 260, an optimal model may be determined.

Figure 3:
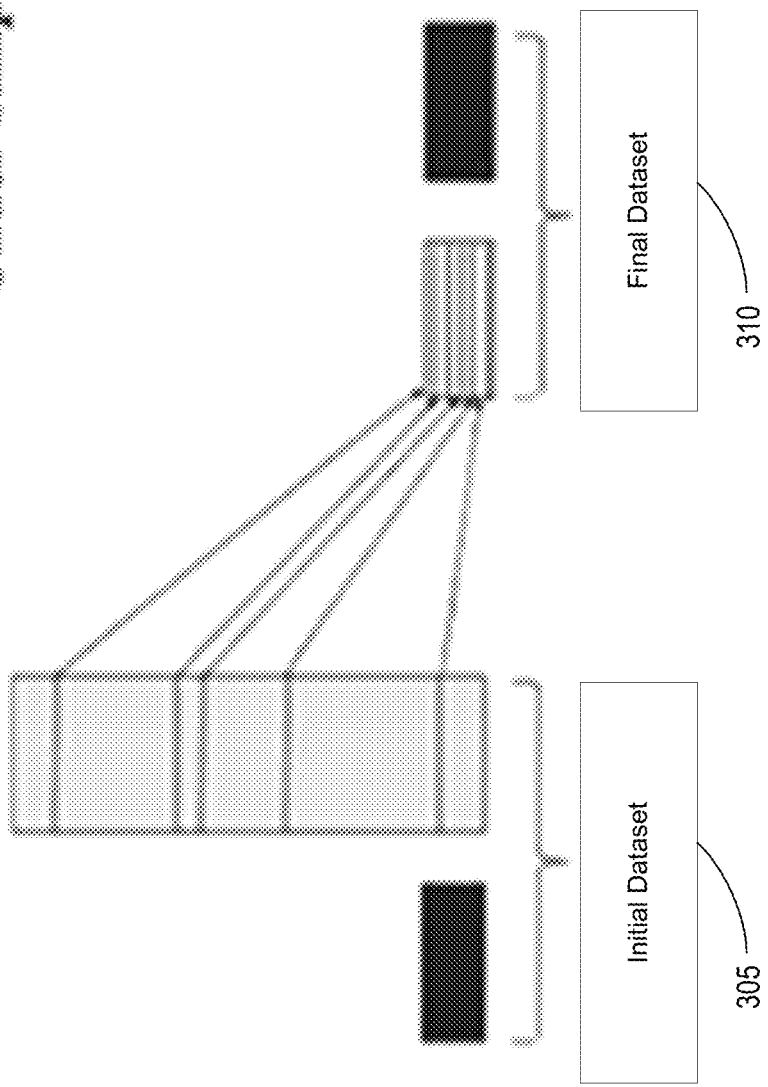
FIG. 3 depicts an illustrative method for feature reduction.

FIG. 3 depicts an illustrative method for feature reduction. Referring to FIG. 3, a training dataset may be collected with around 1 million samples. An out-of-sample and out-of-time dataset may be collected for the testing. Generally, the training dataset may be an imbalanced dataset, different sampling techniques may be utilized to determine a balanced dataset. The sampling techniques may include, for example, utilizing all data (no-sampling), and under-sampling with different ratios of fraud samples vs. non-fraud samples, where the ratios may be, for example, (1:1), (1:2), and/or (1:4). An under-sampling technique with the ratio of fraud samples vs. non-fraud samples (1:1) is generally considered to be an industry standard for a balanced dataset, and it shows the best performance. Accordingly, the under-sampling technique with the ratio of fraud samples vs. non-fraud samples (1:1) may be applied to obtain an optimal version of model.

Initial dataset 305 may include raw data, such as non-fraud data (100,000 records×39 features) and two fraud data (18,030 records×39 features), for a total size of 118,030 records×39 features. After the under-sampling technique is applied, a new dataset may be obtained, that may include, for example, non-fraud data (18,030 records×39 features) and fraud data (18,030 records×39 features), for a total size of 36,060 records×39 features. Final dataset 310 may include 80% of 36,060 records×39 features (i.e., 28,848 records×39 features) as a trainset, and 20% of 36,060 records×39 features (i.e., 7,212 records×39 features) as a testset.

FIG. 4 depicts an illustrative configuration for Bayesian Optimization. Bayesian Optimization search may play a significant role in model training. Hyper-parameters of XGBoost may be selected to configure the model. As illustrated in FIG. 4, in some embodiments, nine parameters may be selected, such as, for example, a learning rate, n-estimators, maximum depth, subsample, colsample, gamma, reg-alpha, minimum child weight, and colsample by tree. In a Grid Search or Random Search, all grid points need to be utilized. However, Bayesian Optimization provides flexibility by allowing a use of a lower bound and an upper bound for the hyper-parameters. For example, as indicated in FIG. 4, the lower and upper bounds for the learning rate may be 0.01 and 1.0 respectively. Likewise, example lower and upper bounds for other hyper-parameters are illustrated. Bayesian Optimization is an approximate global optimization because it explores all hyper-planes for the selected parameters. Accordingly, cross-validations with scoring of 'roc_auc' may be performed, and several iterations may be allowed in configuring the model.

Figure 5:
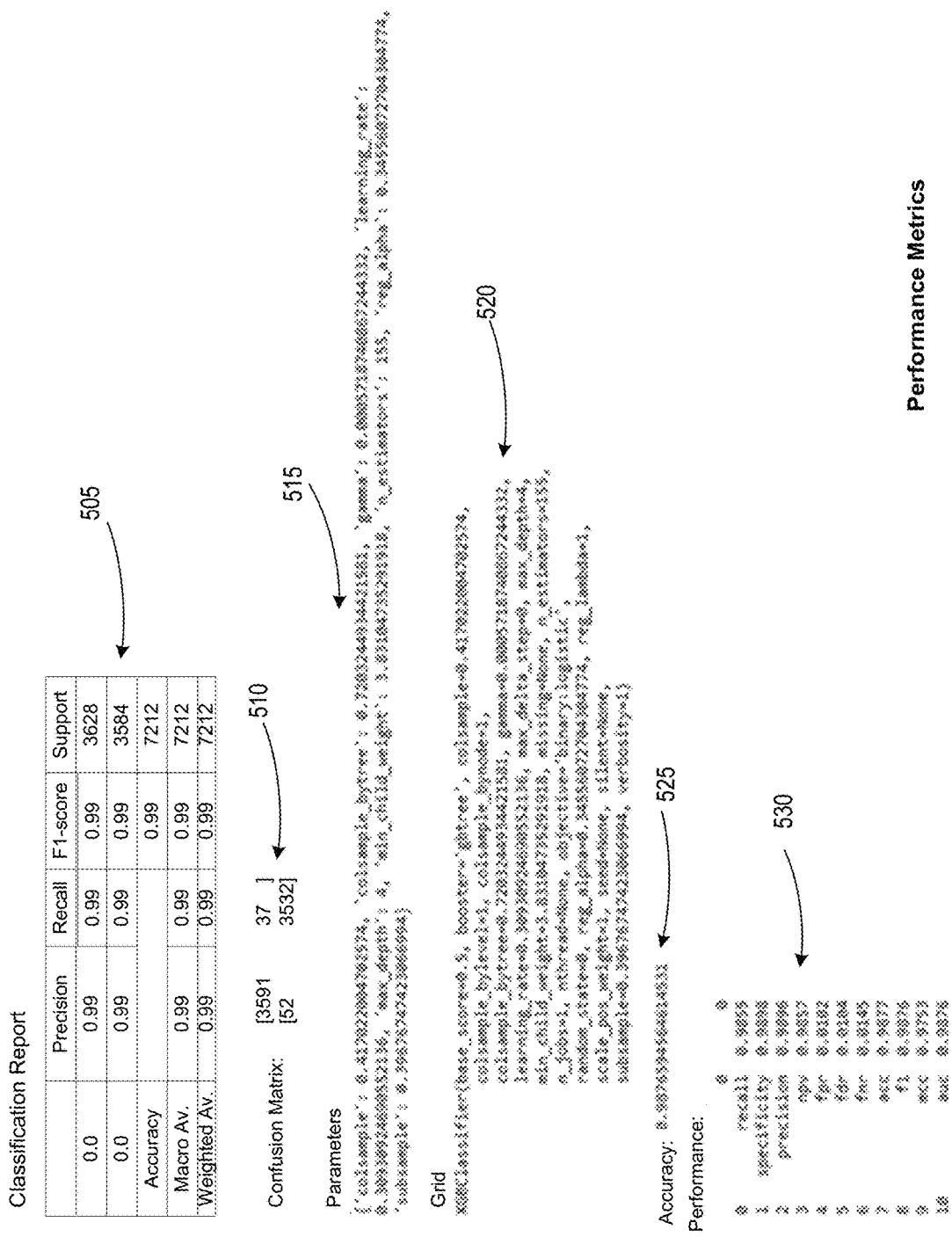
FIG. 5 depicts an example of performance metrics for determining optimal machine learning models.

FIG. 5 depicts an example of performance metrics for determining optimal machine learning models. The output performance metrics in FIG. 5 may be obtained from model predicting/testing on the testset (e.g., the testset of FIG. 3 comprising 7,212 records×39 features). This may include, for example, best parameters after utilizing the Bayesian optimization search, XGBoostClassifier including default hyper-parameters without the best parameters, performance metrics on a false positive rate (fpr), a true positive rate (tpr), an area under a curve (AUC), an F1-measure, and an accuracy (ACC), and a threshold table.

For example, table 505 illustrates a classification report where the columns may correspond to a precision, a recall, an F1-score, and a support value. Also, for example, a confusion matrix 510 may be generated. The hyper-parameters 515 for XGBoost may be selected. For example, colsample by level, colsample by level, colsample bytree, gamma, learning rate, max delta step, max depth, min child weight, n-estimator, reg alpha, reg lambda, and so forth may be selected.

The chosen performance criterion might be 'auc', 'f1', 'acc', 'fpr', 'tpr', and so forth for a comparison of models. Generally, this may depend on the problem definition. For purposes of the examples described herein, minimizing a false positive rate (fpr) and/or maximizing the true positive rate (tpr) may be utilized. In some instances, the fpr may be minimized and the tpr may be maximized at the same time. Also, for example, Accuracy 'auc' 525 may be utilized as a performance criterion. Output performance metrics 530 may be provided.

FIG. 6 depicts an example threshold table with false positive rates. Referring to FIG. 6, as depicted in the first row, a challenge rate (e.g., a fpr) may be 0.010198 at a 0.5 threshold. The lower value indicates that a degree of satisfaction for customers. Accordingly, keeping a low number is significant for higher customer satisfaction, and may be a significant parameter for the trained model. In instances where performance may be within a threshold of a predetermined criterion, feature engineering and data analysis may not necessary at this stage. As illustrated, threshold table 605 may include a threshold, challenge rate, and a fraud capture rate. Generally, either the challenge rate or the fraud capture rate may be utilized as a parameter to select the training dataset.

In some embodiments, optimal model generation computing platform 110 may store a generated model may in a pickle file, and/or a PMML file. The PMML file may be utilized for model deployment. In some embodiments, the generated model may provide a number of features, for example, 31 features may be utilized.

In some embodiments, optimal model generation computing platform 110 may generate, based on a plurality of initial feature vectors indicative of the login activity, one or more candidate datasets. For example, 5 datasets may be collected at various times (e.g., different dates). In some instances, the most recent dataset may be the targeted dataset. The target dataset is the dataset to which the optimal machine learning model may be applied to detect unauthorized activity. The other 4 datasets may be candidate datasets, where one or more datasets, or combinations thereof, may be determined and selected as a trainset for model training.

The problem may be stated as generating an optimal XGBoost model that may be utilized to test the testset, so as to minimize a challenge rate (or fpr). Generally, the candidate datasets may be tested, and data massage techniques, and/or feature engineering techniques, may be applied to the candidate datasets to determine one or more datasets, or combinations thereof, may be determined and selected as a trainset.

In some instances, for example, in addition to 4 candidate non-fraud datasets, 3 fraud datasets (e.g., from consumers) may be provided. For purposes of the description herein, we may refer to the non-fraud datasets as d1, d2, d3, d4, and d5. The candidate datasets may be d1, d2, d3 and d4, and the target dataset may be d5. In some embodiments, optimal model generation computing platform 110 may select a plurality of combinations of the one or more candidate datasets. For example, a trainset may be determined from the candidate datatsets, d1, d2, d3, and d4. Determining the trainset may be a challenging and time-consuming problem. Generally, as a number of candidate datasets increases, a number of combinations may increase exponentially. For example, N candidate datasets may result in $2^N-1$ combinations. For example, 4 datasets may result in $2^4-1=15$ combinations for datasets, as shown below:

{d1}, {d2}, {d3}, {d4},
{d1, d2}, {d1, d3}, {d1, d4}, {d2, d3}, {d2,d4}, {d3, d4}
{d1, d2, d3}, {d1, d2, d4}, {d1, d3, d4}, {d2, d3, d4}
{d1, d2, d3, d4}

In instances that utilize an XGBoost Grid Search algorithm for tuning the hyper-parameters, the time taken to train a model may take approximately 5 hours. Accordingly, for the 15 combinations, it may take 5 hours×15 combinations, or 75 hours to train the model. This is the time taken to train the model. However, when time taken for pre-processing is added, the total time may be much greater than 75 hours. Also, for example, even though the Grid Search algorithm performs an exhausted search via each grid for finding the best parameters, the solution may generally not be the global optimum. As described herein, Bayesian Optimization addresses such issues.

In some embodiments, optimal model generation computing platform 110 may perform one or more of reducing a number of combinations from candidate datasets (e.g., reduce the number from 15 to a smaller number), determining how many features need to be utilized, determining whether or not other search algorithms may be utilized to fine-tune hyper-parameters, selection of the parameters, and/or configuration of the search algorithms. Also, for example, optimal model generation computing platform 110 may determine how the data processing, model training and prediction/test may be performed in tandem. As another example, optimal model generation computing platform 110 may determine how to reduce a data discrepancy between training data and prediction/test data.

In some embodiments, to ensure the data consistency for an on-going model use, optimal model generation computing platform 110 may leverage a standard t-test to validate data quality of the input feature set. The t-value may be a ratio of a difference between two datasets and a difference within the datasets. A larger the t-value may be indicative of a larger discrepancy between datasets. A smaller the t-value may be indicative of a larger similarity between datasets. In some embodiments, a t-value may be associated with a confidence level. To minimize a false positive rate, a confidence level of 99.9% may be selected, and the associated t-values may be ±3.291, which may be set as a threshold.

In some embodiments, optimal model generation computing platform 110 may collect sample data indicative of login activity at periodic intervals. For example, approximately 1 million login transaction samples may be collected monthly, and utilized as a monitoring dataset. The training dataset may be used as a baseline dataset. If the t-value of any feature is beyond the threshold, optimal model generation computing platform 110 may trigger an alert notification to a model development team, who may determine whether dependent session data fields are missing and/or inaccurate.

In some embodiments, optimal model generation computing platform 110 may determine, for a pair of test datasets of the one or more candidate datasets, a data quality score indicative of a correlation between the candidate datasets in the pair. Generally, the data quality score may include a correlation percentage indicative of a correlation between two candidate datasets. For instance, the data correlation percentage may be determined to be 65.62% for d1 and d2, with a confidence level 99.9% for the related t-value located at the range of ±3.291. Also, for example, the data quality score may include a feature alert rate indicative of a lack of correlation between two candidate datasets. For example, the higher the alert rate, the more uncorrelated the two datasets may be.

As described herein, a minimum feature requirement may be determined from the first dataset. For example, the model stored in the PMML file may indicate a number of required features to be 31 features. In some embodiments, optimal model generation computing platform 110 may perform a data quality check. As described herein, we consider the 5 datasets, with 4 of the datasets d1, d2, d3, and d4 as candidate datasets. Based on the data quality check described herein, a training dataset may be selected based on the 4 candidate datasets. The selected training dataset may be utilized to train the model, and the model may then be utilized to predict/test the most recent dataset, for example, d5, so as to minimize a false positive rate.

In some embodiments, optimal model generation computing platform 110 may perform pre-processing by removing features that may be deemed to be unnecessary, and reduce each candidate dataset to 31 features. In some embodiments, optimal model generation computing platform 110 may generate a correlation graph, where a node of the correlation graph may represent a candidate dataset of the one or more candidate datasets, and an edge between two nodes may be associated with a data quality score for the pair of candidate datasets corresponding to the two nodes. The data quality score may be a data correlation percentage or a feature alert rate.

Figure 7:
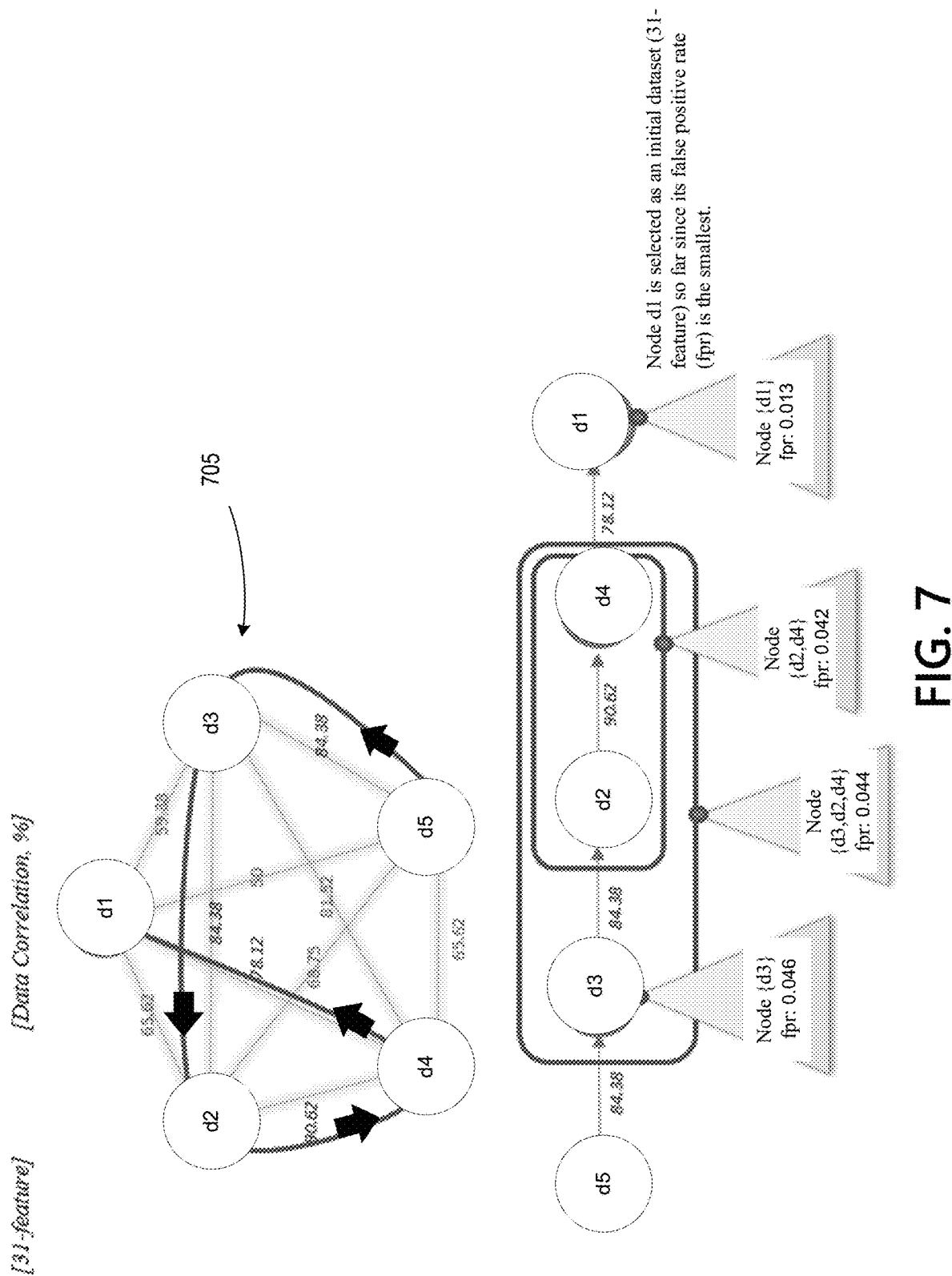
FIG. 7 depicts an example method of determining a training dataset.

FIG. 7 depicts an example method of determining a training dataset. Referring to FIG. 7, a correlation graph 705 is shown. In some embodiments, optimal model generation computing platform 110 may determine, for the correlation graph, a high correlation path or a 'most correlation path', where a next node of the high correlation path may be selected based on an edge with an optimal data quality score. In some embodiments, when the data quality score is a correlation percentage, the optimal data quality score may be the highest correlation percentage. In some embodiments, when the data quality score is a feature alert rate, the optimal data quality score may be the lowest feature alert rate.

In some embodiments, optimal model generation computing platform 110 may determine the high correlation path by starting at the node representing the target dataset d5. For purposes of this description, a node and the corresponding dataset represented by the node may be given the same label. The correlation percentage for the pair (d5, d4) is 65.62%, correlation percentage for the pair (d5, d2) is 68.75%, correlation percentage for the pair (d5, d1) is 50%, and correlation percentage for the pair (d5, d3) is 84.38%. Accordingly, since the correlation percentage for the pair (d5, d3) is a maximum, the node representing dataset d3 may be selected as the next node, and a first portion of the high correlation path may be the path (d5, d3).

A similar algorithm may be applied at the node d3 to identify the next node of the nodes that have not been visited thus far. For example, nodes d1, d2, and d4 have not been visited. Accordingly, starting at node d3, the correlation percentage for the pair (d3, d1) is 59.38%, the correlation percentage for the pair (d3, d2) is 84.38%, and the correlation percentage for the pair (d3, d4) is 81.52%. Accordingly, since the correlation percentage for the pair (d3, d2) is a maximum, the node representing dataset d2 may be selected as the next node, and a second portion of the high correlation path may be the path (d3, d2). Accordingly, optimal model generation computing platform 110 may determine a portion of the high correlation path as (d5, d3, d2) as indicated by the arrows. A similar algorithm may be iteratively utilized to determine the high correlation path as (d5, d3, d2, d4, d1), as indicated by the arrows.

In some embodiments, optimal model generation computing platform 110 may flatten the path with the correlation percentage on the edges. Then, optimal model generation computing platform 110 may group the nodes, for example, as 3 nodes {d3}, {d2, d4}, {d1} and further extend one big node {d3, d2, d4}. For example, d2 and d4 may be grouped together based on the highest correlation percentage for the pair (d2, d4). The groups may be illustrated within rectangles, with nodes denoted by triangles, as shown in FIG. 7. Accordingly, as described herein, the possible combinations of candidate datasets may be reduced from 15 to 4, thereby resulting in a considerable time economy. The model processing may be the same as described herein, and comprise steps such as (i) the generation of new datasets with a specific feature, (ii) the setting of Bayesian Optimization configuration, (iii) Model training with XGBoostClassifier, and (iv) the output of performance metrics.

Also, for example, optimal model generation computing platform 110 may utilize a Bayesian optimization search with an XGBoost Classifier to determine performance metrics. For example, a false positive rate (fpr) may be determined at a 0.5 threshold as a criterion. For example, as illustrated within the triangles in FIG. 7, for Node {d3}, the fpr may be determined as 0.046, for Node {d2, d4}, the fpr may be determined as 0.042, for Node {d1}, the fpr may be determined as 0.013, and for Node {d3, d2, d4}, the fpr may be determined as 0.044. Accordingly, Node {d1} may be determined to have the lowest fpr of 0.013, and may be selected as a training dataset.

Figure 8:
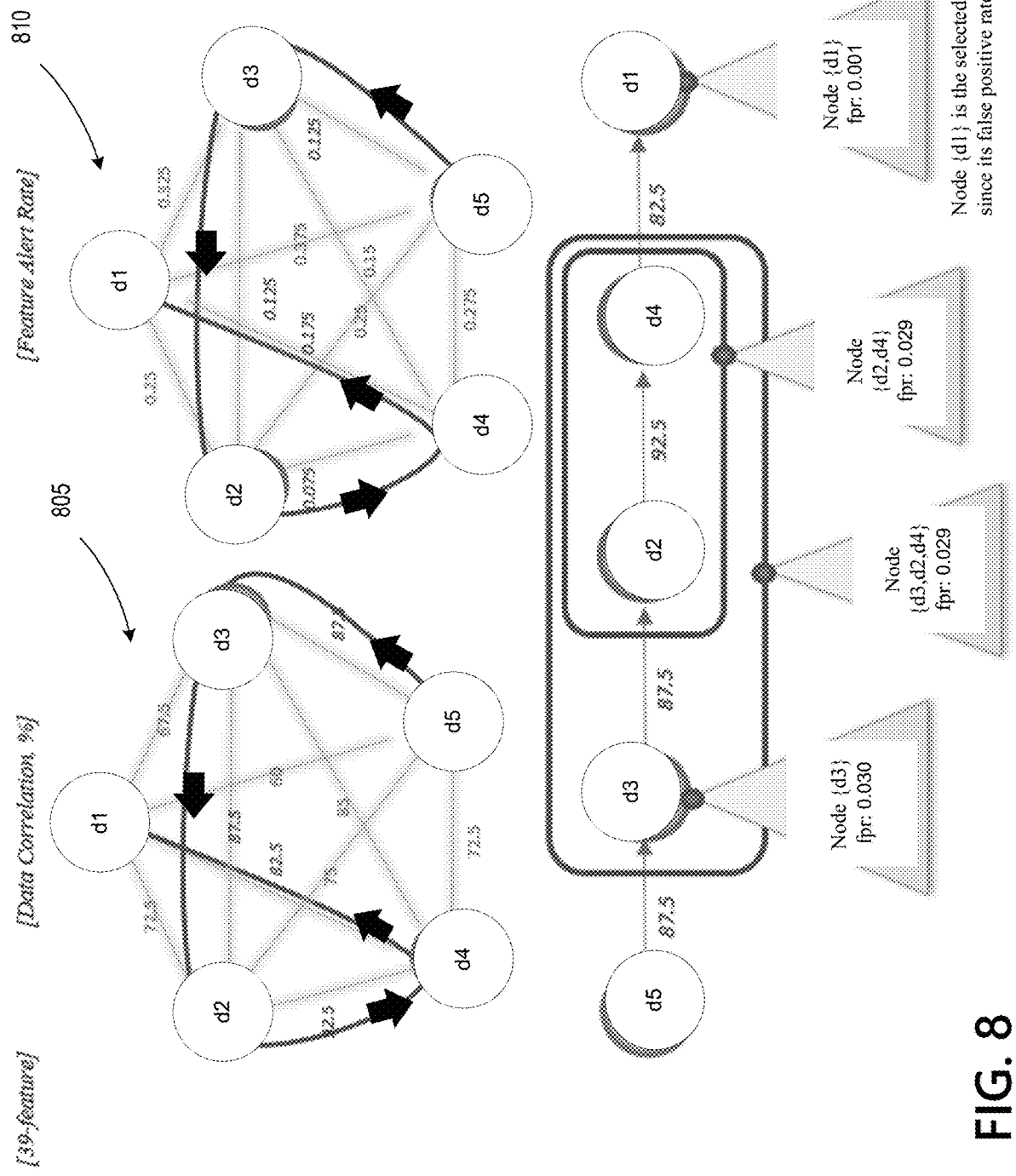
FIG. 8 depicts another example method of determining a training dataset.

FIG. 8 depicts another example method of determining a training dataset. In some embodiments, optimal model generation computing platform 110 may increase the number of feature to from 31 features (described with reference to FIG. 7) to 39 features and repeat the steps described with reference to FIG. 7. Here, a first correlation graph 805 is based on the correlation percentage, and a second correlation graph 810 is based on the feature alert rate. As described herein, for the data correlation percentage, optimal model generation computing platform 110 may select the higher values for the path, and for the feature alert rate, optimal model generation computing platform 110 may select the lower value for the path. Accordingly, optimal model generation computing platform 110 may determine a high correlation path, (d5, d3, d2, d4, d1), in both the first correlation graph 805 and the second correlation graph 810, as indicated by the respective arrows. In some embodiments, optimal model generation computing platform 110 may flatten the path with the correlation percentage on the edges. Next, optimal model generation computing platform 110 may group the nodes as 3 nodes {d3}, {d2, d4}, {d1}, and further extend one big node {d3, d2, d4}, as illustrated with the triangles in FIG. 8.

After the model processing, optimal model generation computing platform 110 may utilize a Bayesian optimization search with an XGBoost Classifier to determine performance metrics. For example, a false positive rate (fpr) may be determined at a 0.5 threshold as a criterion. For example, as illustrated within the triangles in FIG. 8, for Node {d3}, the fpr may be determined as 0.030, for Node {d3, d2, d4}, the fpr may be determined as 0.029, for Node {d2, d4}, the fpr may be determined as 0.029, and for Node {d1}, the fpr may be determined as 0.001. Accordingly, Node {d1} may be determined to have the lowest fpr of 0.001, and may be selected as a training dataset.

Upon comparing to the 31-feature datasets described with reference to FIG. 7, the fpr of node d1 is lower. For example, the fpr for d1 is 0.013 for the 31-feature datasets, and is 0.001 for the 39-feature datasets. This step to analyze the candidate datasets with different features results in considerable time savings. Also, for example, the Bayesian Optimization search performs the modelling, and finally the performance metrics checked with a threshold table indicate that the false positive rate as a criterion to determine which combination is appropriate for the training dataset. Accordingly, at this step of generating the model, optimal model generation computing platform 110 may select the 39-feature dataset, d1, as a training set, and may develop the training model. Then, optimal model generation computing platform 110 may utilize this model to predict/test the target dataset d5, and generate the performance metrics shown in FIG. 9.

Figure 9:
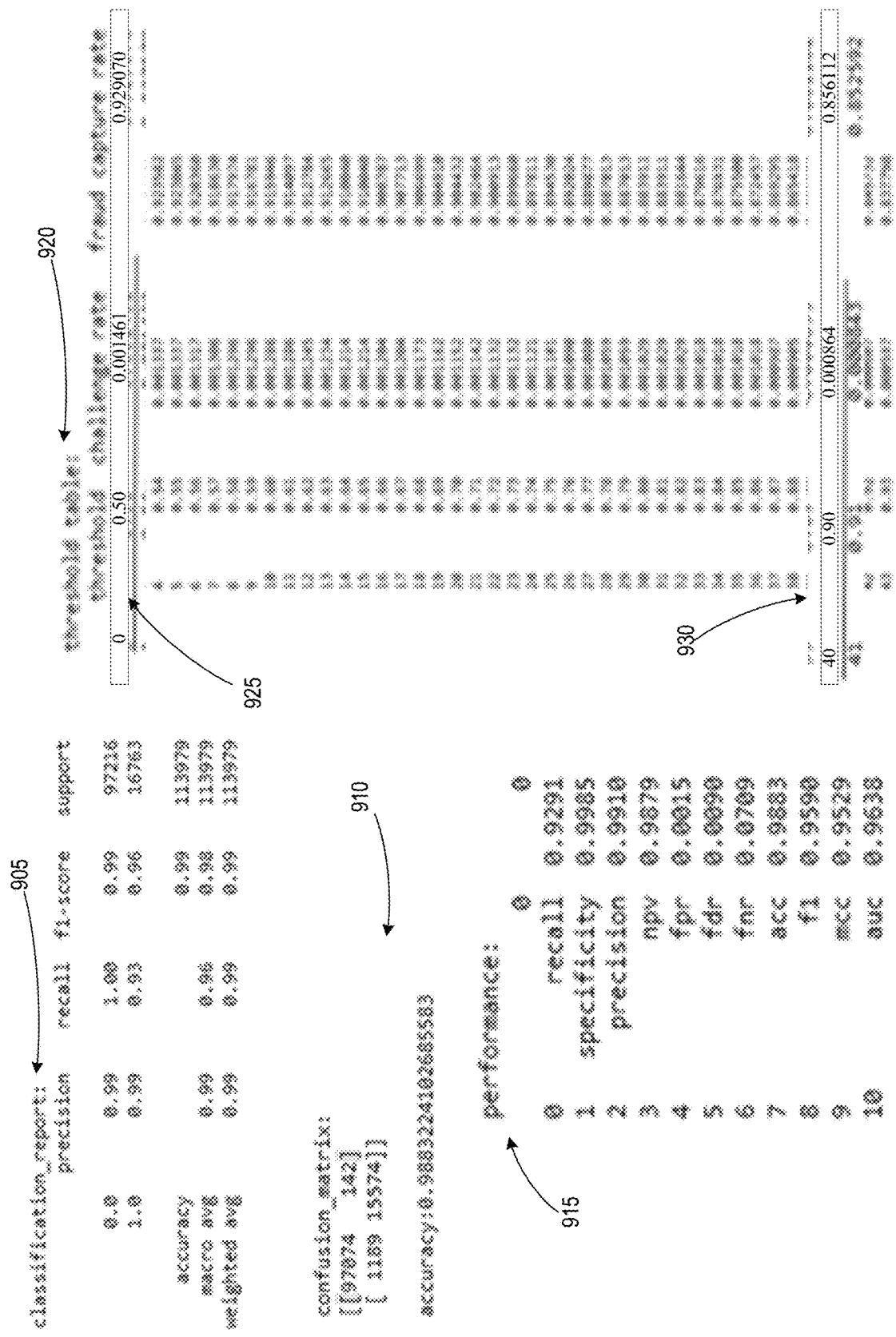
FIG. 9 depicts example output performance metrics.

FIG. 9 depicts example output performance metrics for the training model. A testing set may be the 39-feature dataset d5. A classification report 905 may be generated with values for precision, recall, F1-score, and support. Also, for example, a confusion matrix 910 may be determined, an accuracy may be determined, and one or more performance metrics 915 may be determined. Also, for example, a threshold table 920 may be generated. As indicated by the first row 925 of the threshold table 920, the challenge rate (i.e. false positive rate) is 0.001461 at a 0.5 threshold, which is a lower value than the previous performance, 0.010198 at a 0.5 threshold, as shown in the first row of threshold table 605 of FIG. 6. The discrepancy may be based on the number of features. The threshold table 605 of FIG. 6 corresponds to a 31-feature dataset d1 as a training set. However, the threshold table 920 of FIG. 9 corresponds to a 39-feature dataset d1 as a training set. Row 930, representing row 40 of threshold table 920 of FIG. 9, shows that at a threshold of 0.90, the challenge rate may be lowered to the value 0.000864. Accordingly, the training model performs well on the 39-feature target dataset d5.

Although a training dataset (e.g., d1) may be determined, the number of features increased from a 31-feature dataset to a 39-feature dataset. Accordingly, optimal model generation computing platform 110 may need to determine if an optimal model may be found for datasets with feature numbers within 31 and 39, or beyond 39 (it has been determined that 31 features are the minimum number needed). Accordingly, optimal model generation computing platform 110 may perform feature engineering. In some embodiments, optimal model generation computing platform 110 may generate a feature engineering table, where a row of the table may represent a feature of the one or more initial features, and a column may represent a candidate training model, and an entry in a cell corresponding to the row and the column may be indicative of a significance of the feature to the candidate training model. FIG. 10 depicts an example feature engineering table. For example, the features 1010 may be the 39 features in dataset d1, and a rank 1005 may be determined for each feature. As illustrated, models 1016 may be utilized, and for each feature, it may be determined if the feature is a significant feature for the model. In some embodiments, the models may be one or more of PEARSON, Chi-2, RFE, Logistics, Random Forest, Light GBM, XGBoost, extra-Tree, decisionTree, Gradient Boost, ada Boost, and cal Boost. For example, in the first row, all cells corresponding to the feature "CBP_DEVC_CUST" have an entry "True" indicating that the feature is significant for all the twelve models 1016. Accordingly, a total 1020 may indicate a score of 12 indicative of 12 "True" entries corresponding to the feature "CBP_DEVC_CUST".

As another example, in the second row, all cells corresponding to the feature "CBP_CUST_DEVC" have an entry "True" indicating that the feature is significant for all the twelve models 1016. Accordingly, a total 1020 may indicate a score of 12 indicative of 12 "True" entries corresponding to the feature "CBP_CUST_DEVC".

Also, for example, in the last row, for the feature "CBP_CUST_ABDN_CHALL_NEWDEVC", the cells corresponding to models decisionTree and ada Boost, are labeled "True", while the remaining 10 cells are labeled "False". Accordingly, the feature "CBP_CUST_ABDN_CHALL_NEWDEVC" may be determined to be a significant feature for the models, decisionTree and ada Boost, and may be determined to be not significant for the remaining 10 models. Accordingly, a total 1020 may indicate a score of 2 indicative of 2 "True" entries corresponding to the feature "CBP_CUST_ABDN_CHALL_NEWDEVC". As indicated, a rank 1005 may be determined based on the total 1020. From top to bottom, the table shows that the most important feature is 'CBP_DEVC_CUST' with a score of 12, and the least important feature is 'CBP_CUST_ABDN_CHALL_NEWDEVC' with a score of 2.

In some embodiments, optimal model generation computing platform 110 may identify the one or more production feature vectors is based on the feature engineering table. For example, the rank 1005 may be utilized as a threshold to filter one or more features of the 39 features in dataset d1. For example, with a threshold score of 6 or greater than 6, the feature engineering table may indicate that there are 22 features, with a threshold score of 5 or greater than 5, the feature engineering table may indicate that there are 30 features, with a threshold score of 3 or greater than 3, the feature engineering table may indicate that there are 36 features. Accordingly, optimal model generation computing platform 110 may perform the model processing for these 3 use cases. False positive rates for each use case may be determined, and optimal model generation computing platform 110 may determine that the use case corresponding to 36 features has the lowest false positive rate; therefore, obtain the output performance metrics for this case.

Figure 11A:
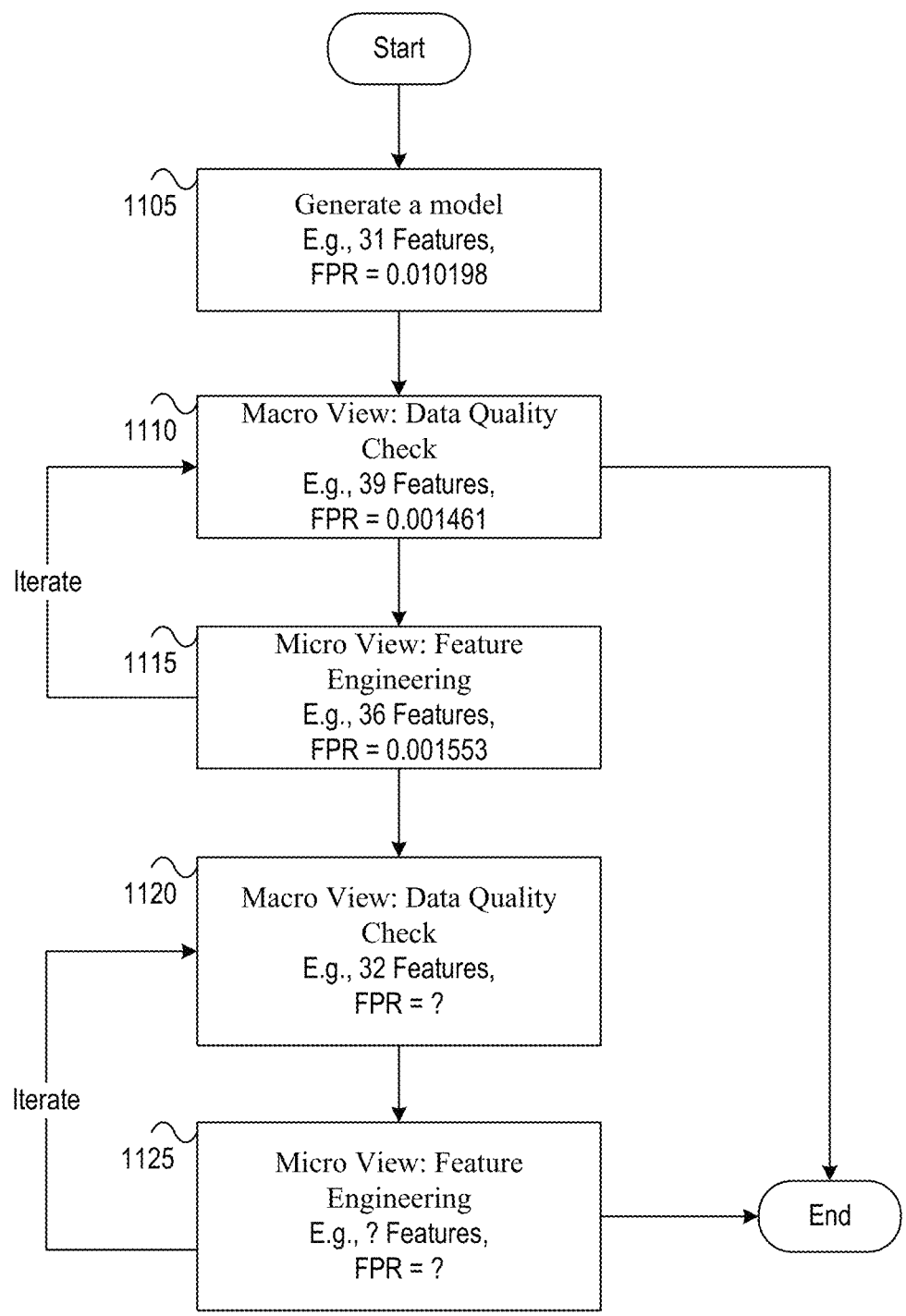
FIGS. 11A and 11B illustrate a pseudo data massage methodology.
Figure 11B:
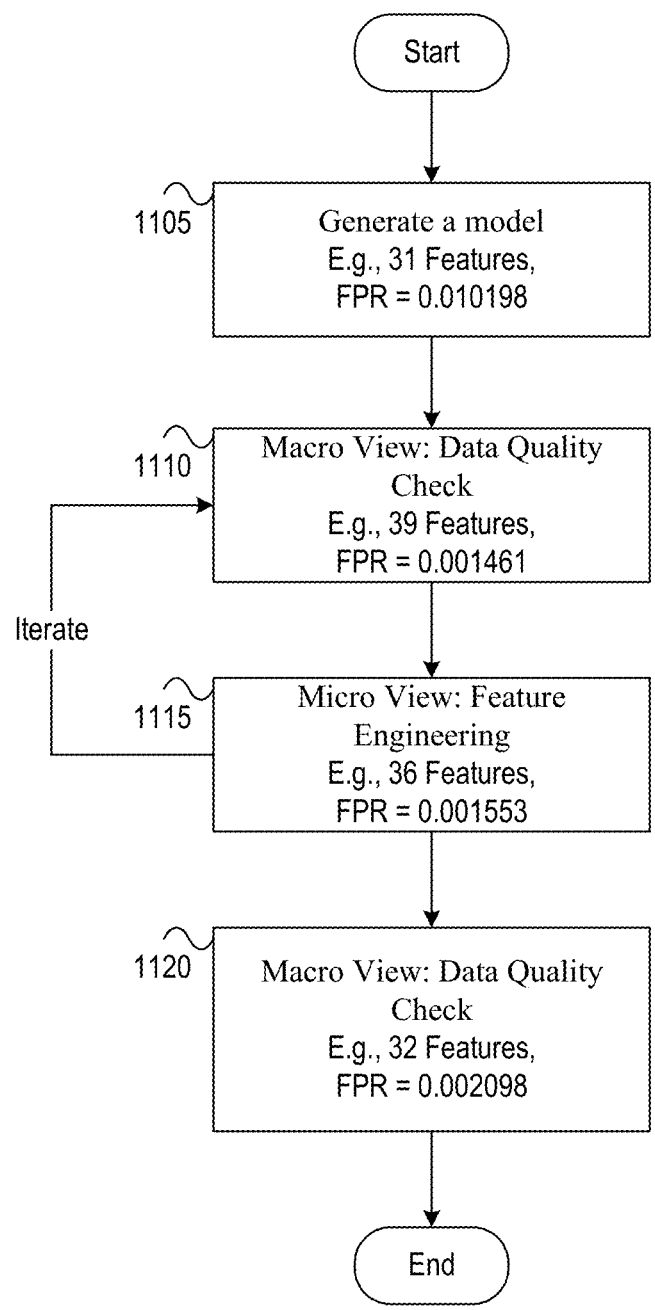

FIGS. 11A and 11B illustrate a pseudo data massage methodology. Referring to FIG. 11A, as described with reference to FIGS. 7 and 8, at step 1105 optimal model generation computing platform 110 may begin with a 31-feature dataset, perform a data quality check, feature engineering, and at step 1110, may determine that the best model is a 39-feature dataset d1, with the lowest false positive rate 0.001461 (referencing row 925 of threshold table 920 of FIG. 9). In some embodiments, optimal model generation computing platform 110 may determine this to be the training dataset, and the process may terminate. This may be because, as described herein, the 39-feature dataset d1 may be selected based on the performance metrics, and the correlation graph methodology.

However, the purpose herein is to illustrate the data massage methodology. Accordingly, an iterative procedure may be performed. At step 1115, the 36-feature dataset d1 may have a model PMML file, based on the feature engineering table, with 32 features being used. Accordingly, optimal model generation computing platform 110 may return to step 1110 to a macro-view to check if there may be a more optimal solution. Such an iterative process between steps 1110 and 1115 may be performed several times.

In some embodiments, optimal model generation computing platform 110 may remove 4 features from the PMML file of the 36-feature model to obtain a 32-feature model. Accordingly, optimal model generation computing platform 110 may re-perform the data quality check at step 1120, and the feature engineering at step 1125, in an iterative manner. For example, optimal model generation computing platform 110 may generate a new correlation graph to determine an optimal dataset, and/or perform feature engineering for the features in the optimal dataset. Accordingly, by performing the data quality check and the feature engineering in an iterative manner, optimal model generation computing platform 110 may determine if datasets other than d1, such as d2, d3, and d4 may be better options for a training dataset.

Generally, the macro-view (data quality check) and the micro-view (feature engineering) may be located at the iterative path, as reference by steps 245 and 250 of FIG. 2. Optimal model generation computing platform 110 may terminate the iterative steps whenever the performance is worse than the previous one. The macro-view is to reduce the number of combinations (like massage push), and the micro-view is to find the possible number of features for the datasets (like massage release).

Referring to FIG. 11B, as indicated, steps 1105-1115 are similar to the corresponding steps of FIG. 11A. However, at step 1120, optimal model generation computing platform 110 may select, after model processing as described herein, the 32-feature dataset d1, with a value of false positive value (fpr) 0.002098 at a 0.5 threshold. Since the fpr here is larger than the previously selected model, the 39 feature dataset d1, with an fpr of 0.001461 at a 0.5 threshold, optimal model generation computing platform 110 may not perform the feature engineering process, and the process may terminate with a selection of the 39 feature dataset d1 as the training dataset. As described herein, in order to minimize data discrepancy between training data and prediction/test data, optimal model generation computing platform 110 may be configured to perform the data regeneration, data modeling, data prediction, data testing, and comprehensive performance metrics outcome, in real-time, and in the production environment, thereby saving computing time and resources, and providing threat detection in real-time.

Although an optimal model may be determine based on a data massage methodology, optimal model generation computing platform 110 may evaluate the candidate models to determine whether or not there is over-fitting. For each model, optimal model generation computing platform 110 may generate the performance metrics, and plot the performance metrics to analyze how learning is revealed during training. Accordingly, optimal model generation computing platform 110 may generate a report indicating how well a model performs on the training and testing datasets during model training. Such performance measures may be utilized to create a line plot to analyze how the model may behave on training and test datasets during training epochs.

Figure 12:
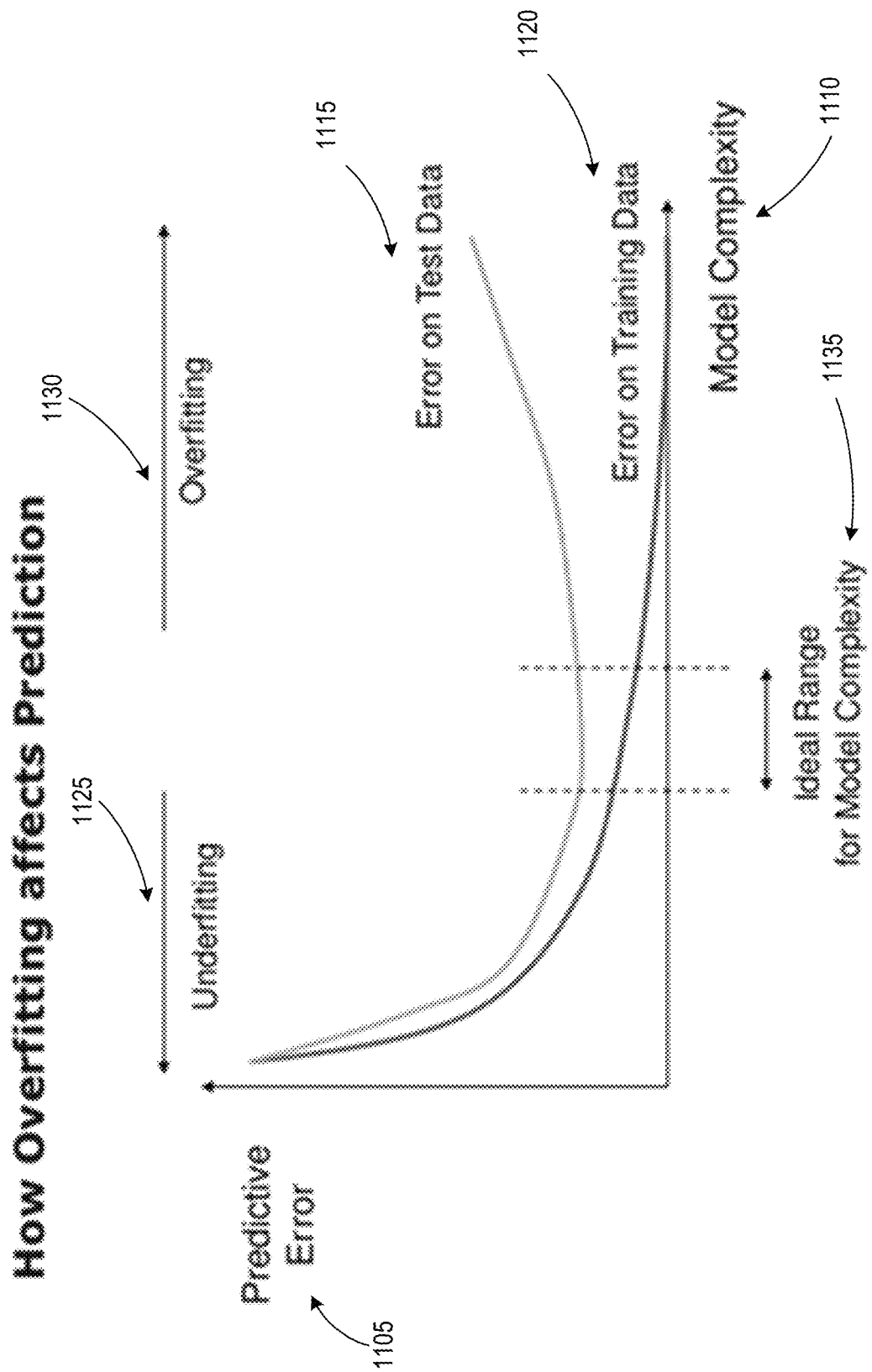
FIG. 12 illustrates determining a preferred range for model complexity.

FIG. 12 illustrates determining a preferred range for model complexity. The vertical axis may represent predictive error 1105, and the horizontal axis may represent epochs for model complexity 1110. A graph for an error on test data 1110 may be compared to a graph for an error on training data 1120. Optimal model generation computing platform 110 may determine an ideal range for epochs for model complexity 1135 based on the comparison. For epochs corresponding the left of the epochs for model complexity 1135, optimal model generation computing platform 110 may determine that an underfitting 1125 has occurred. For epochs corresponding the right of the epochs for model complexity 1135, optimal model generation computing platform 110 may determine that an overfitting 1130 has occurred.

Figure 13:
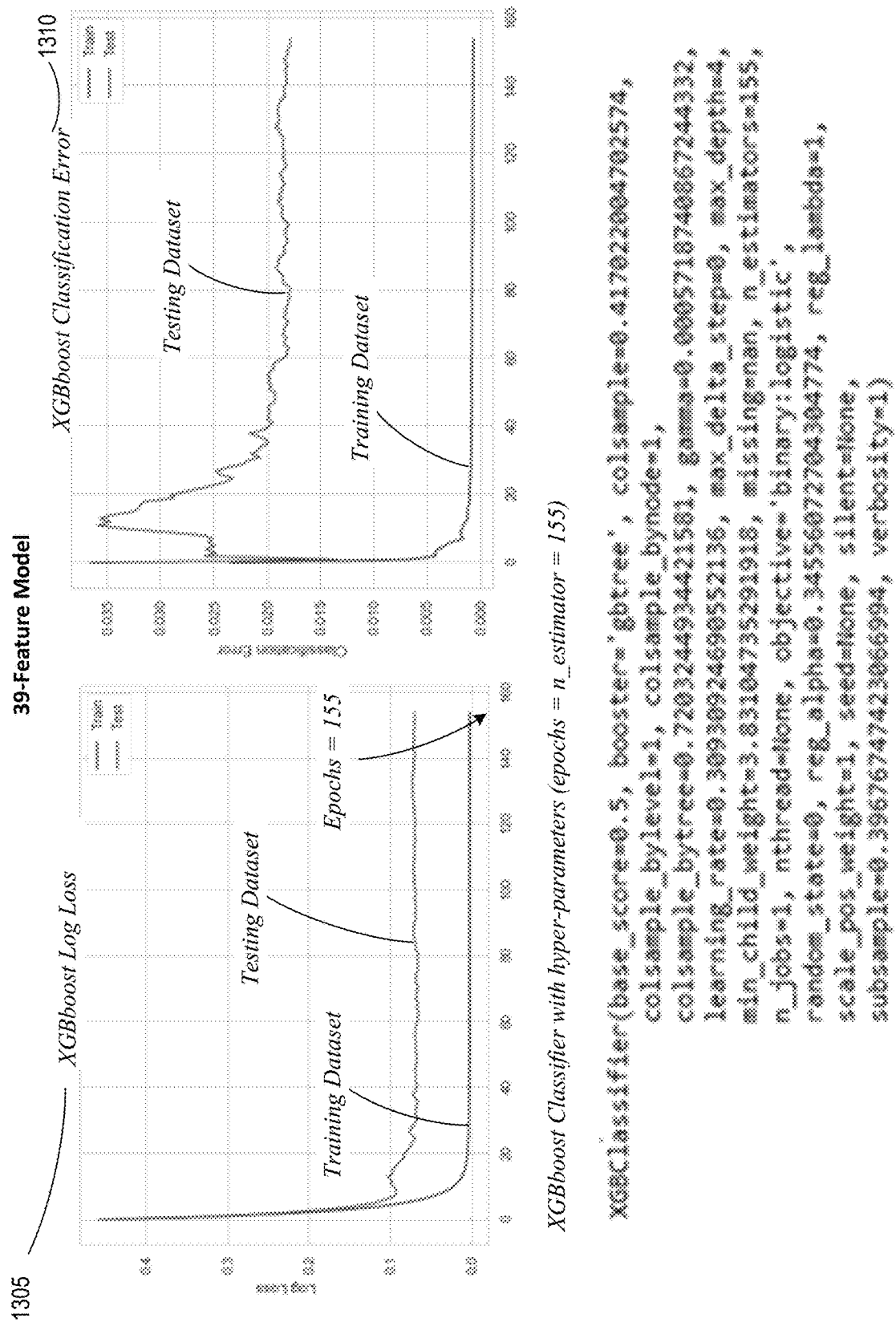
FIG. 13 illustrates an example feature model.

FIG. 13 illustrates an example feature model. Referring to FIG. 13, optimal model generation computing platform 110 may generate two plots. A first plot 1305 illustrates a logarithmic loss of the XGBoost model for each epoch on the training dataset and the test dataset, (ii) a second plot 1310 illustrates a classification error of the XGBoost model for each epoch on the training and test datasets. As indicated, plots for the 39-feature training dataset, d1, and target dataset, d5, and based on an XGBboost Classifier with hyper-parameters, and epochs provided by an n_estimator=155 are illustrated. This model may be an example of checking for and over-fitting test. The prediction error may be set for (i) Log Loss error and (ii) Classification error. The plot of Log Loss error 1305 shows that the overall epochs are 155 at the x-axis. In the Log Loss error plot 1305, the curve for the training dataset decreases, and the curve for the testing dataset decreases. In the Classification error plot 1310, the curve for the training dataset decreases, and the curve for the testing dataset initially increases when the epochs are around 12-13, and then decreases as the epochs increase. Accordingly, if the epochs are set at value 155, there is no over-fitting. Therefore, this model passes the evaluation of over-fitting.

Figure 14:
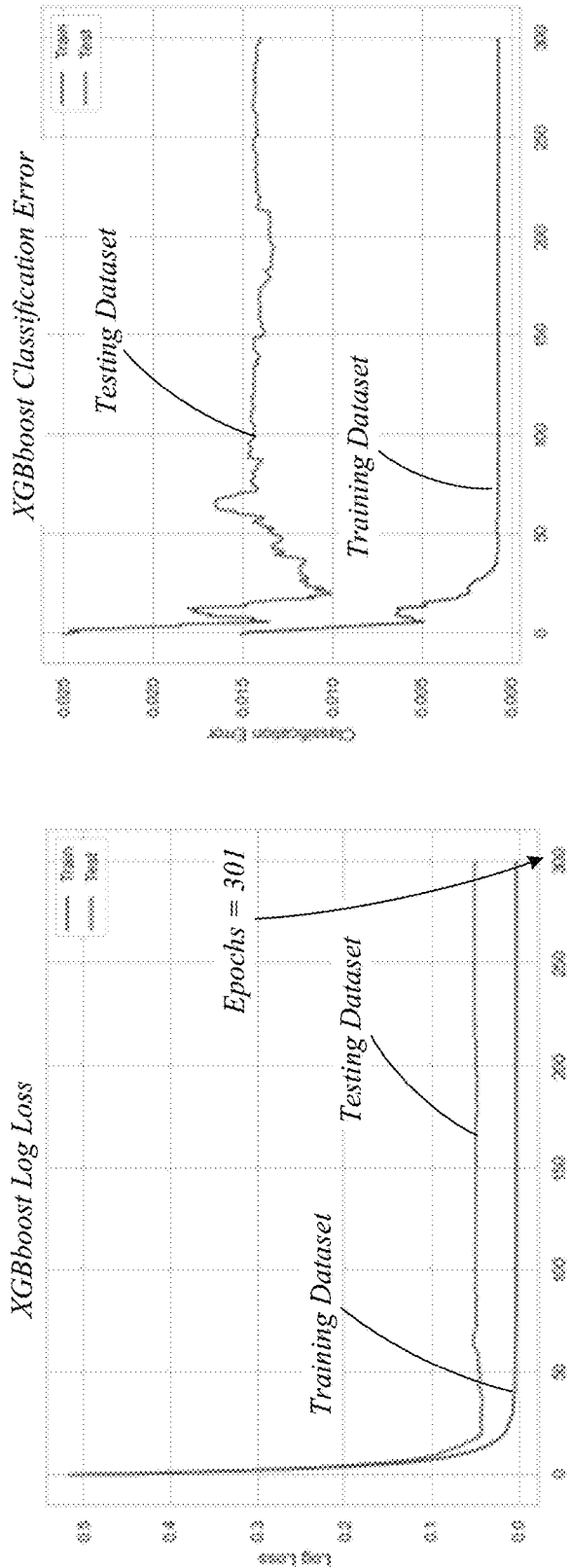
FIG. 14 illustrates another example feature model.

FIG. 14 illustrates another example feature model. Referring to FIG. 14, optimal model generation computing platform 110 may generate two plots. Like in FIG. 13, a first plot illustrates a logarithmic loss of the XGBoost model for each epoch on the training dataset and the test dataset, (ii) a second plot illustrates a classification error of the XGBoost model for each epoch on the training and test datasets. As indicated, plots for the 32-feature training dataset, d1, and target dataset, d5, and based on an XGBboost Classifier with hyper-parameters, and epochs provided by an n_estimator=301 are illustrated. This model may be an example of checking for an over-fitting test. The prediction error may be set for (i) Log Loss error and (ii) Classification error. The plot of Log Loss error shows that the overall epochs are 301 at the x-axis. In the Log Loss error plot, the curve for the training dataset and the curve for the testing dataset decrease. In the Classification error plot, the curve for the training dataset decreases, and the curve for the testing dataset initially increases when the epochs are around 70, and then decreases as the epochs increase. Accordingly, if the epochs are set at value 301, there is no over-fitting. Therefore, this model passes the evaluation of over-fitting.

Figure 15:
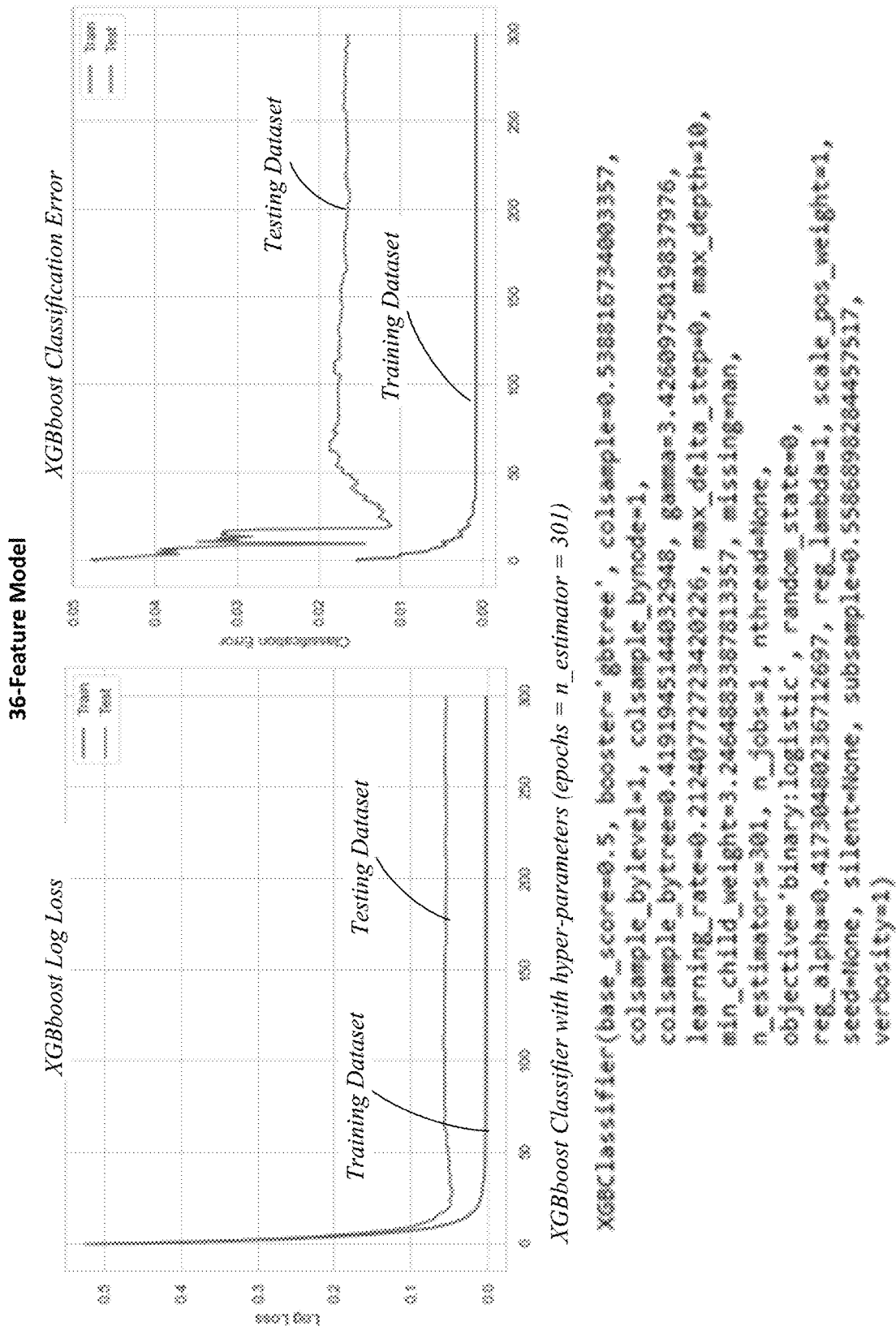
FIG. 15 illustrates another example feature model.

FIG. 15 illustrates another example feature model. Referring to FIG. 15, optimal model generation computing platform 110 may generate two plots. Like in FIGS. 13 and 14, a first plot illustrates a logarithmic loss of the XGBoost model for each epoch on the training dataset and the test dataset, (ii) a second plot illustrates a classification error of the XGBoost model for each epoch on the training and test datasets. As indicated, plots for the 36-feature training dataset, d1, and target dataset, d5, and based on an XGBboost Classifier with hyper-parameters, and epochs provided by an n_estimator=301 are illustrated. This model may be an example of checking for an over-fitting test. The prediction error may be set for (i) Log Loss error and (ii) Classification error. The plot of Log Loss error shows that the overall epochs are 301 at the x-axis. In the Log Loss error plot, the curve for the training dataset and the curve for the testing dataset decrease. In the Classification error plot, the curve for the training dataset decreases, and the curve for the testing dataset initially increases when the epochs are around 68, and then decreases as the epochs increase. Accordingly, if the epochs are set at value 301, there is no over-fitting. Therefore, this model passes the evaluation of over-fitting.

FIGS. 16A-D illustrate an example method of determining an optimal model. The analysis described herein enables a determination of which dataset may be included in a training dataset. Accordingly, optimal model generation computing platform 110 may set each dataset as a training dataset, and test the target dataset, d5. The results at a 0.9 threshold for an XGBoost algorithm are illustrated.

Referring to FIG. 16A, results of a training dataset d1 and target dataset d5 are illustrated. Two plots are illustrated, with the horizontal axis 1605 representing threshold values, a left vertical axis 1610 representing a fraud capture rate axis, and a right vertical axis 1615 representing a challenge rate axis. A first curve 1620 representing a fraud capture rate curve, and a second curve 1625 representing a challenge rate curve are illustrated. A vertical line 1630 represents a threshold value of 0.9. As indicated by the circle, the second curve 1625 representing the challenge rate curve intersects the vertical line 1630 representing the threshold value of 0.9. Accordingly, for the training dataset d1 and target dataset d5, at a threshold of 0.9, a challenge rate is determined to be 0.0009 and a fraud capture rate is determined to be 0.8561.

Figure 16D:
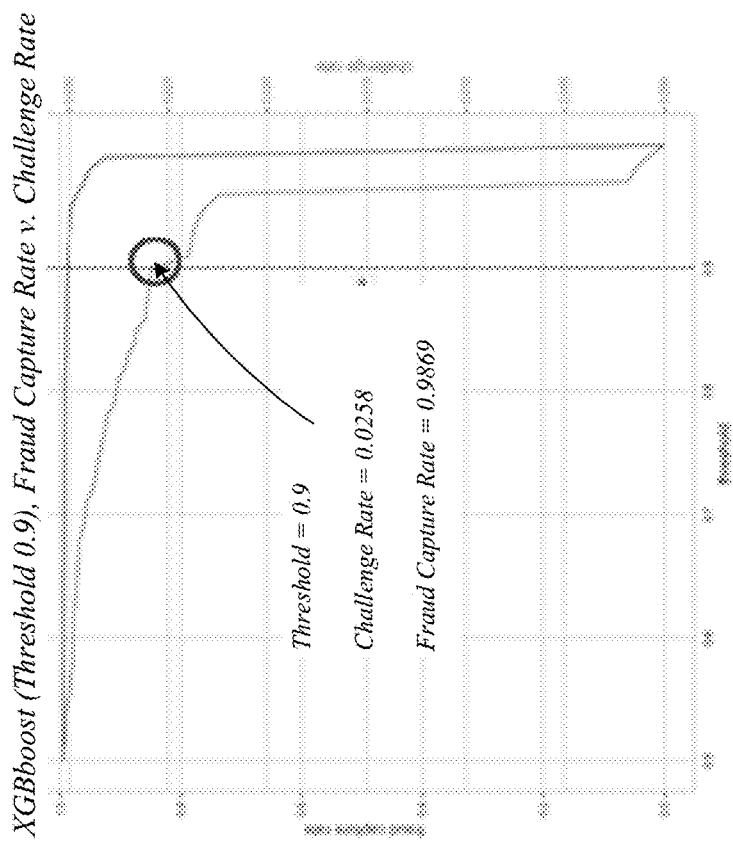
Figure 16C:
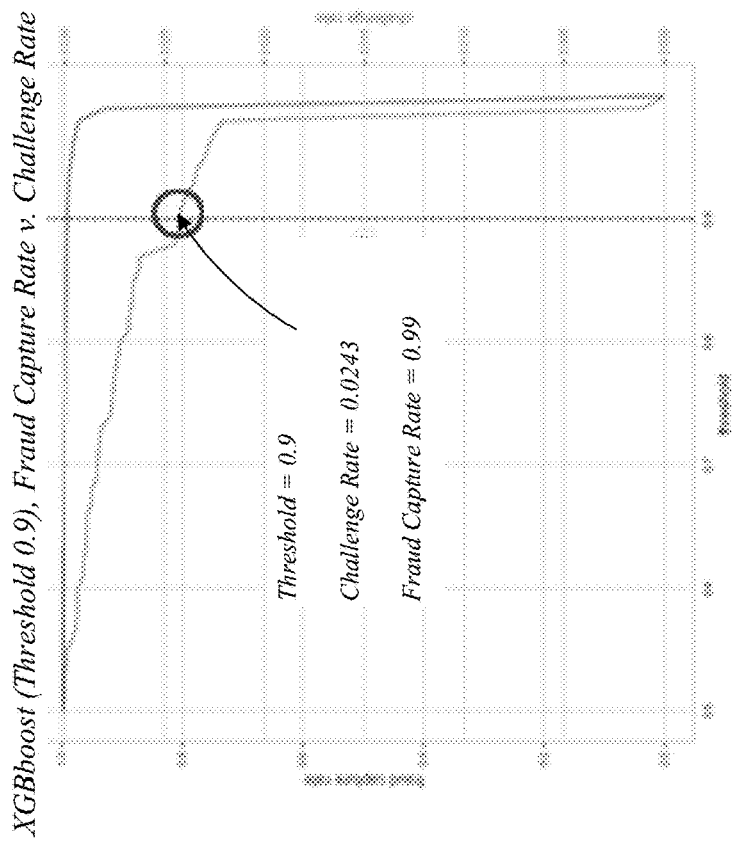

FIGS. 16B-C are similar to FIG. 16A, and represent results for datasets d2, d3, and d4, with the target dataset d5. Referring to FIG. 16B, the challenge rate curve intersects the vertical line representing the threshold value of 0.9; accordingly, for the training dataset d2 and target dataset d5, at a threshold of 0.9, a challenge rate is determined to be 0.0294 and a fraud capture rate is determined to be 0.979.

Referring to FIG. 16C, the challenge rate curve intersects the vertical line representing the threshold value of 0.9; accordingly, for the training dataset d3 and target dataset d5, at a threshold of 0.9, a challenge rate is determined to be 0.0243 and a fraud capture rate is determined to be 0.99.

Referring to FIG. 16D, the challenge rate curve intersects the vertical line representing the threshold value of 0.9; accordingly, for the training dataset d4 and target dataset d5, at a threshold of 0.9, a challenge rate is determined to be 0.0258 and a fraud capture rate is determined to be 0.9869.

Accordingly, a model for the training dataset d1 and target dataset d5 provides the lowest challenge rate of 0.0009 as compared to other datasets d2, d3, and d4. Accordingly, based on such analysis, optimal model generation computing platform 110 may select dataset d1 as a training dataset, perform testing on target dataset d5. Accordingly, in addition to other techniques disclosed herein, optimal model generation computing platform 110 may further validate a selected training dataset. Accordingly, the data massage described herein may be powerful and robust to obtain an optimal model since every combination is analyzed to ensure a robust solution with a significant reduction of time taken for data analysis and visualization.

Figure 17:
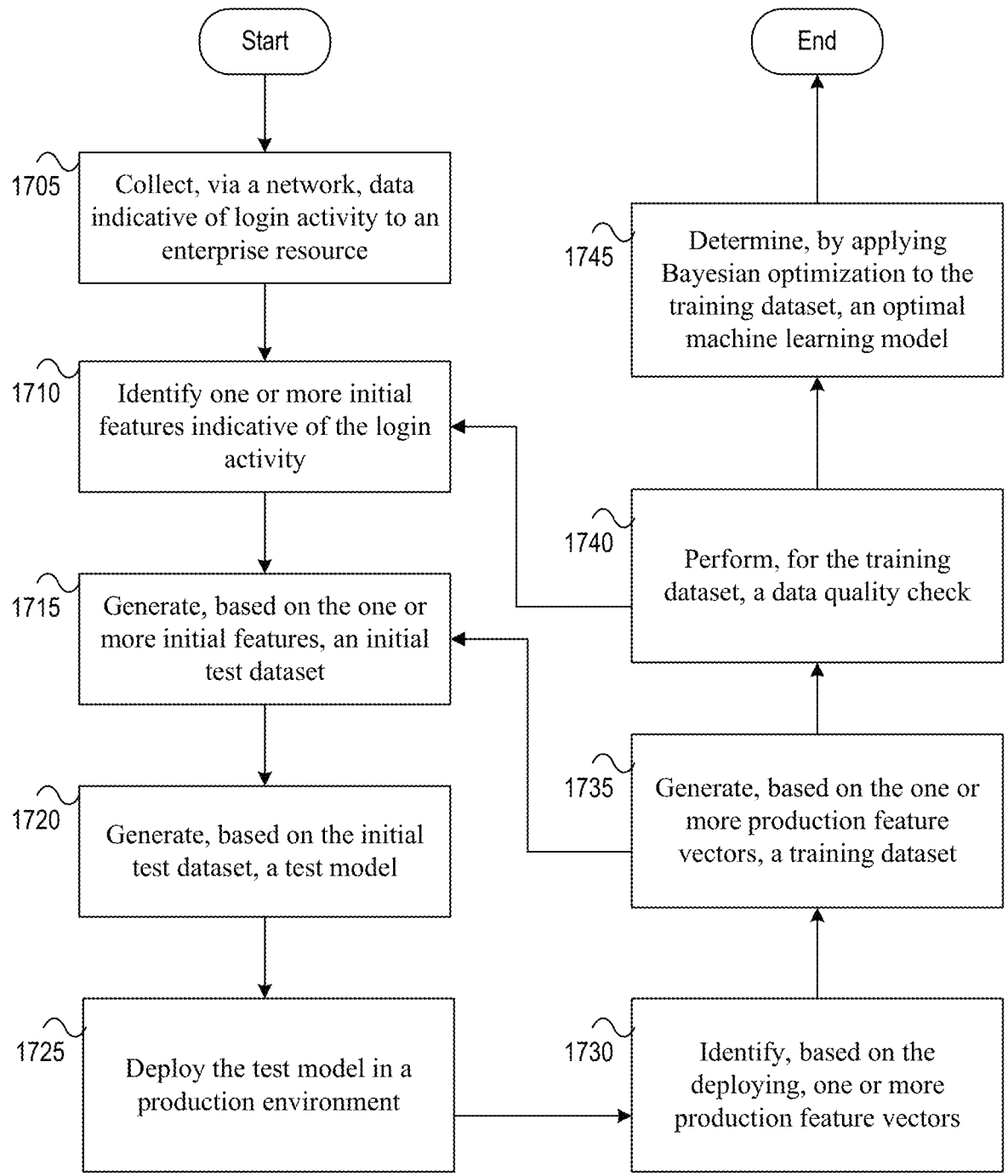
FIG. 17 is an illustrative method for determining optimal machine learning models.

FIG. 17 is an illustrative method for determining optimal machine learning models. Referring to FIG. 17, at step 1705, an optimal model generation computing platform 110, having at least one processor, and memory storing computer-readable instructions that, when executed by the at least one processor, cause optimal model generation computing platform 110 to collect, via a network, data indicative of login activity to an enterprise resource. At step 1710, optimal model generation computing platform 110 may identify one or more initial features indicative of the login activity. At step 1715, optimal model generation computing platform 110 may generate, based on the one or more initial features, an initial test dataset. At step 1720, optimal model generation computing platform 110 may generate, based on the initial test dataset, a test model. At step 1725, optimal model generation computing platform 110 may deploy the test model in a production environment. At step 1730, optimal model generation computing platform 110 may identify, based on the deploying, one or more production feature vectors.

At step 1735, optimal model generation computing platform 110 may generate, based on the one or more production feature vectors, a training dataset. In some embodiments, the process may return to step 1715 to generate another test dataset and re-perform steps 1720-1735. Several iterations may be performed to identify the training dataset. At step 1740, optimal model generation computing platform 110 may perform, for the training dataset, a data quality check. In some embodiments, the process may return to step 1710 to identify feature vectors that may be deleted, and/or previously deleted feature vectors that may be added. At step 1745, optimal model generation computing platform 110 may determine, by applying Bayesian optimization to the training dataset, an optimal machine learning model.

Figure 18:
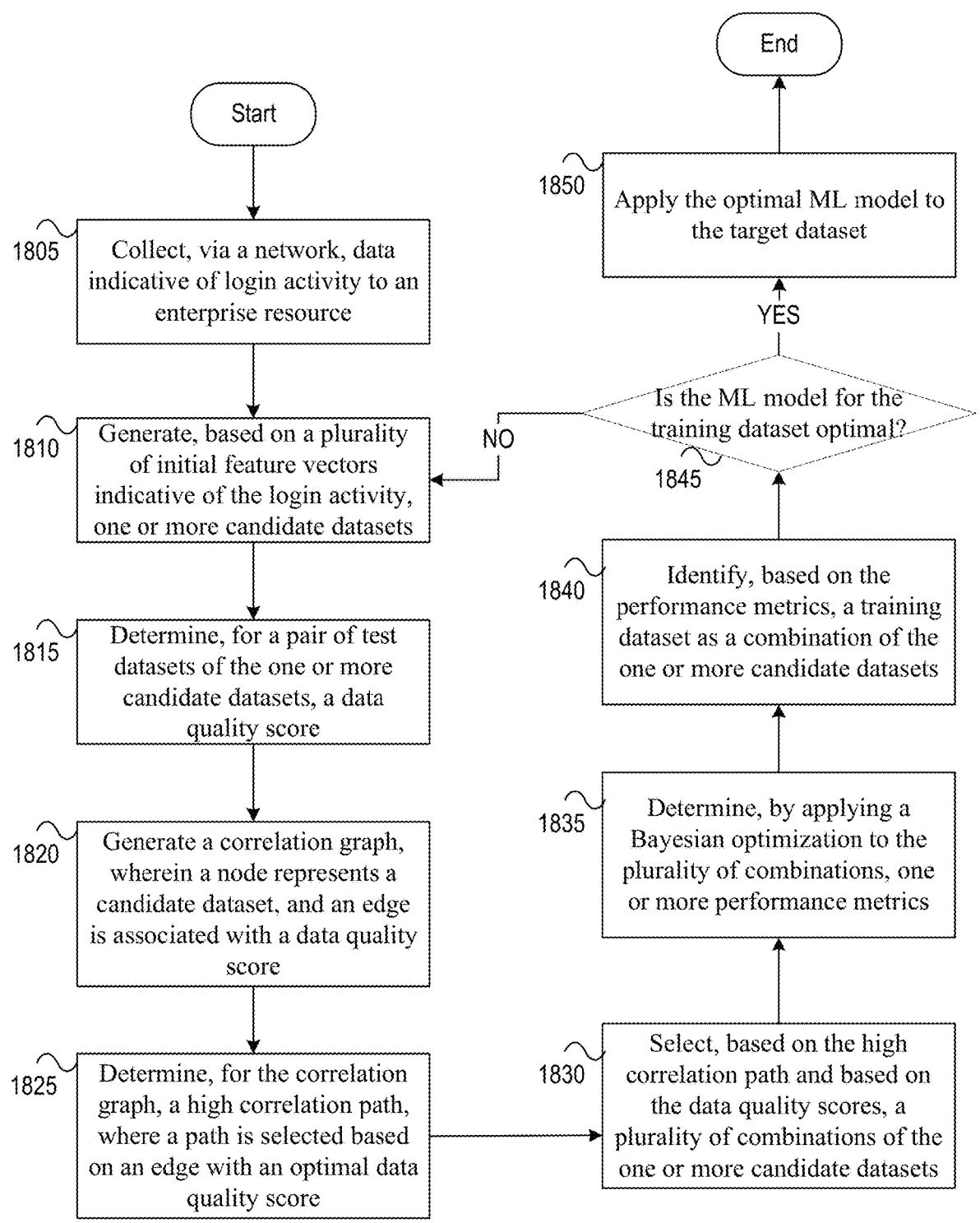
FIG. 18 is another illustrative method for determining optimal machine learning models.

FIG. 18 is another illustrative method for determining optimal machine learning models. Referring to FIG. 18, at step 1805, an optimal model generation computing platform 110, having at least one processor, and memory storing computer-readable instructions that, when executed by the at least one processor, cause optimal model generation computing platform 110 to collect, via a network, data indicative of login activity to an enterprise resource. At step 1810, optimal model generation computing platform 110 may generate, based on a plurality of initial feature vectors indicative of the login activity, one or more candidate datasets. At step 1815, optimal model generation computing platform 110 may determine, for a pair of test datasets of the one or more candidate datasets, a data quality score indicative of a correlation between the candidate datasets in the pair. At step 1820, optimal model generation computing platform 110 may generate a correlation graph, wherein a node of the correlation graph represents a candidate dataset of the one or more candidate datasets, and an edge between two nodes is associated with a data quality score for the pair of candidate datasets corresponding to the two nodes.

At step 1825, optimal model generation computing platform 110 may determine, for the correlation graph, a high correlation path, where a next node of the high correlation path is selected based on an edge with an optimal data quality score. At step 1830, optimal model generation computing platform 110 may select, based on the high correlation path and based on the data quality scores, a plurality of combinations of the one or more candidate datasets. At step 1835, optimal model generation computing platform 110 may determine, by applying a Bayesian optimization to the plurality of combinations of the one or more candidate datasets, one or more performance metrics. At step 1840, optimal model generation computing platform 110 may identify, based on the one or more performance metrics, a training dataset as a combination of the plurality of combinations of the one or more candidate datasets.

At step 1845, optimal model generation computing platform 110 may determine if the machine learning model for the training dataset is optimal. In some embodiments, upon a determination that the machine learning model for the training dataset is not optimal, optimal model generation computing platform 110 may return to step 1810 to identify feature vectors that may be deleted, and/or previously deleted feature vectors that may be added. Also, for example, optimal model generation computing platform 110 may return to step 1810 to generate one or more candidate datasets (e.g., additional combinations of existing candidate datasets). Upon a determination that the machine learning model for the training dataset is optimal, optimal model generation computing platform 110 may proceed to step 1850. At step 1850, optimal model generation computing platform 110 may apply the optimal machine learning model to a target dataset.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor; and
   memory storing computer-readable instructions that, when executed by the at least one processor, cause the computing platform to:
      collect, via a network, data indicative of login activity to an enterprise resource;
      identify one or more initial features indicative of the login activity;
      generate, based on the one or more initial features, an initial test dataset;
      generate, based on the initial test dataset, a test model;
      deploy the test model in a production environment;
      generate a feature engineering table, wherein a row of the table represents a feature of the one or more initial features, and a column represents a candidate training model, and an entry in a cell corresponding to the row and the column is indicative of a significance of the feature to the candidate training model;
      identify, based on the deploying and the feature engineering table, one or more production feature vectors;
      generate, based on the one or more production feature vectors, a training dataset;
      perform, for the training dataset, a data quality check; and
      determine, by applying Bayesian optimization to the training dataset, an optimal machine learning model.

2. The computing platform of claim 1, wherein the instructions comprise additional computer-readable instructions that, when executed by the at least one processor, cause the computing platform to:
   apply the optimal machine learning model to detect unauthorized attempts to access the enterprise resource.

3. The computing platform of claim 1, wherein the instructions comprise additional computer-readable instructions that, when executed by the at least one processor, cause the computing platform to:
   reduce, based on data analysis, the one or more initial features.

4. The computing platform of claim 1, wherein the instructions comprise additional computer-readable instructions that, when executed by the at least one processor, cause the computing platform to:
   perform the data quality check based on one or more performance criteria.

5. The computing platform of claim 4, wherein the one or more performance criteria comprise one or more of a false positive rate (fpr), a true positive rate (tpr), an area under a curve (AUC), an F1-measure, and an accuracy (ACC).

6. The computing platform of claim 1, wherein the instructions comprise additional computer-readable instructions that, when executed by the at least one processor, cause the computing platform to:
   determine, for the training dataset, whether a false positive rate is below a first threshold;
   determine, for the training dataset, whether a true positive rate is above a second threshold;
   determine that one or more of: the false positive rate is above the first threshold, and the true positive rate is below the second threshold; and
   adjust the initial test dataset.

7. The computing platform of claim 1, wherein the instructions comprise additional computer-readable instructions that, when executed by the at least one processor, cause the computing platform to:
   identify, based on the Bayesian optimization, one or more optimal hyper parameters for the optimal machine learning model.

8. The computing platform of claim 1, wherein the instructions comprise additional computer-readable instructions that, when executed by the at least one processor, cause the computing platform to:
   identify one or more candidate datasets;
   reduce a number of combinations of the one or more candidate datasets, and
   wherein generating the training dataset is based on the reduced number of combinations.

9. The computing platform of claim 1, wherein the instructions comprise additional computer-readable instructions that, when executed by the at least one processor, cause the computing platform to:
   determine a difference between the initial test dataset and the training dataset; and
   perform the data quality check by validating, based on the difference, a quality of the initial test dataset.

10. The computing platform of claim 9, wherein the instructions comprise additional computer-readable instructions that, when executed by the at least one processor, cause the computing platform to:
    based on a determination that the quality of the initial test dataset does not meet a threshold, trigger an alert to modify the initial test dataset.

11. The computing platform of claim 1, wherein the instructions comprise additional computer-readable instructions that, when executed by the at least one processor, cause the computing platform to:

detect, via an iterative process, that the initial test dataset has been modified based on a determination that a quality of the initial test dataset does not meet a threshold; and update, via the iterative process, the feature engineering table.

12. The computing platform of claim 1, wherein the instructions comprise additional computer-readable instructions that, when executed by the at least one processor, cause the computing platform to:

minimize a predictive error for the training model.

13. One or more non-transitory computer-readable media storing instructions that, when executed by a computing platform comprising at least one processor, and memory, cause the computing platform to:

identify one or more initial features indicative of login activity to an enterprise resource;

generate, based on the one or more initial features, an initial test dataset;

generate, based on the initial test dataset, a test model;

deploy the test model in a production environment;

generate a feature engineering table, wherein a row of the table represents a feature of the one or more initial features, and a column represents a candidate training model, and an entry in a cell corresponding to the row and the column is indicative of a significance of the feature to the candidate training model;

identify, based on the deploying and the feature engineering table, one or more production feature vectors;

generate, based on the one or more production feature vectors, a training dataset;

perform, for the training dataset and based on one or more performance criteria, a data quality check;

predict, by applying Bayesian optimization to the training dataset, an optimal machine learning model; and apply the optimal machine learning model to detect unauthorized attempts to access the enterprise resource.

14. A method, comprising:

at a computing platform comprising at least one processor, and memory:

collecting, via a network, data indicative of login activity to an enterprise resource;

identifying one or more initial features indicative of the login activity;

generating, based on the one or more initial features, an initial test dataset;

generating, based on the initial test dataset, a test model;

deploying the test model in a production environment;

generating a feature engineering table, wherein a row of the table represents a feature of the one or more initial features, and a column represents a candidate training model, and an entry in a cell corresponding to the row and the column is indicative of a significance of the feature to the candidate training model;

identifying, based on the deploying and the feature engineering table, one or more production feature vectors;

generating, based on the one or more production feature vectors, a training dataset;

performing, for the training dataset, a data quality check; and determining, by applying Bayesian optimization to the training dataset, an optimal machine learning model.

15. The method of claim 14, further including:

applying the optimal machine learning model to detect unauthorized attempts to access the enterprise resource.

16. The method of claim 14, further including:

reducing, based on data analysis, the one or more initial features.

17. The method of claim 14, further including:

performing the data quality check based on one or more performance criteria.

18. The method of claim 17, wherein the one or more performance criteria comprise one or more of a false positive rate (fpr), a true positive rate (tpr), an area under a curve (AUC), an F1-measure, and an accuracy (ACC).

19. The method of claim 14, further including:

identifying, based on the Bayesian optimization, one or more optimal hyper parameters for the optimal machine learning model.

20. The method of claim 14, further including:

determining a difference between the initial test dataset and the training dataset; and performing the data quality check by validating, based on the difference, a quality of the initial test dataset.

* * * * *